(12) United States Patent
Skinner et al.

(10) Patent No.: US 9,861,033 B2
(45) Date of Patent: Jan. 9, 2018

(54) UNIVERSALLY ADAPTABLE, EASY TO LOAD TRIMMER HEAD WITH FREE ROTATING BUMP KNOB

(71) Applicant: Shakespeare Company, LLC, Columbia, SC (US)

(72) Inventors: David B. Skinner, Columbia, SC (US); Mark R. Wilkinson, Plymouth, MN (US)

(73) Assignee: Shakespeare Company, LLC, Boca Raton, FL (US)

( * ) Notice: Subject to any disclaimer, the term of this patent is extended or adjusted under 35 U.S.C. 154(b) by 141 days.

(21) Appl. No.: 14/384,738

(22) PCT Filed: Mar. 15, 2013

(86) PCT No.: PCT/US2013/032284
§ 371 (c)(1),
(2) Date: Sep. 12, 2014

(87) PCT Pub. No.: WO2013/138752
PCT Pub. Date: Sep. 19, 2013

(65) Prior Publication Data
US 2015/0327436 A1     Nov. 19, 2015

Related U.S. Application Data

(60) Provisional application No. 61/611,268, filed on Mar. 15, 2015, provisional application No. 61/758,849, filed on Jan. 31, 2013.

(51) Int. Cl.
*B26B 7/00*     (2006.01)
*B26B 9/00*     (2006.01)
(Continued)

(52) U.S. Cl.
CPC ................ *A01D 34/4163* (2013.01)

(58) Field of Classification Search
CPC ................ A01D 34/4162; A01D 34/4163
(Continued)

(56) References Cited

U.S. PATENT DOCUMENTS

| 4,151,646 A | 5/1979 | Lane |
| 4,268,964 A | 5/1981 | Moore |

(Continued)

FOREIGN PATENT DOCUMENTS

| EP | 0676127 A1 | 10/1995 |
| EP | 1894459 | 5/2008 |

(Continued)

OTHER PUBLICATIONS

International Search Report.

*Primary Examiner* — Ghassem Alie
*Assistant Examiner* — Bharat C Patel
(74) *Attorney, Agent, or Firm* — Eversheds Sutherland (US) LLP

(57) ABSTRACT

A bump-activated trimmer head for a rotary trimmer of the type that utilizes wound trimmer line to cut vegetation, the trimmer having a rotary shaft defining a rotation axis, a housing attached to the rotary shaft, at least a pair of opposed eyelets through the housing for receiving the trimmer line, a spool encased within the housing and having a passageway for the trimmer line, the opposed ends of the passageway being alignable with the opposed eyelets of the housing. The trimmer head further includes an indexing knob external to the housing and operatively connected to the spool for turning the spool so as to wind the trimmer line onto the spool, and a separate bump knob rotating about the same rotation axis as the shaft, wherein the bump knob is operationally connected to the spool, but is rotationally independent of the shaft, the housing and the spool.

18 Claims, 32 Drawing Sheets

(51) Int. Cl.
*B26B 9/02* (2006.01)
*A01D 34/416* (2006.01)

(58) Field of Classification Search
USPC .................. 30/347, 355, 356, 277.4, 276
See application file for complete search history.

(56) References Cited

U.S. PATENT DOCUMENTS

| | | | |
|---|---|---|---|
| 4,276,691 A * | 7/1981 | Palmieri | A01D 34/4163 30/347 |
| 4,561,180 A | 12/1985 | Pittinger, Sr. et al. | |
| 4,566,189 A * | 1/1986 | Muto | A01D 34/4162 30/276 |
| 4,702,005 A * | 10/1987 | Pittinger, Sr. | A01D 34/4163 30/276 |
| 4,738,085 A | 4/1988 | Nishio et al. | |
| 5,020,223 A * | 6/1991 | Desent | A01D 34/4163 30/276 |
| 5,020,224 A * | 6/1991 | Haupt | A01D 34/4162 30/276 |
| 5,060,384 A | 10/1991 | Everts | |
| 5,063,673 A * | 11/1991 | Webster | A01D 34/4162 30/276 |
| 5,109,607 A * | 5/1992 | Everts | A01D 34/4162 30/276 |
| 5,136,782 A * | 8/1992 | Calcinai | A01D 34/4161 30/276 |
| 5,174,027 A | 12/1992 | Gusthalin | |
| 5,290,014 A * | 3/1994 | Fergison, Jr. | B62D 43/045 242/394 |
| 5,345,683 A | 9/1994 | Kanou | |
| 5,461,787 A * | 10/1995 | Araki | A01D 34/4162 30/276 |
| 5,659,960 A * | 8/1997 | Everts | A01D 34/4163 30/276 |
| 5,671,536 A | 9/1997 | Everts et al. | |
| 5,765,287 A | 6/1998 | Griffini et al. | |
| 5,806,192 A | 9/1998 | Everts et al. | |
| 5,881,464 A * | 3/1999 | Collins | A01D 34/4163 242/597.4 |
| 5,906,051 A | 5/1999 | Nannen | |
| 6,052,907 A | 4/2000 | Wang | |
| 6,148,523 A * | 11/2000 | Everts | A01D 34/4163 30/276 |
| 6,163,964 A | 12/2000 | Calcinai | |
| 6,263,580 B1 * | 7/2001 | Stark | A01D 34/4163 30/276 |
| 6,666,009 B1 | 12/2003 | Brandon | |
| 6,735,874 B2 * | 5/2004 | Iacona | A01D 34/4163 30/276 |
| 6,854,185 B1 | 2/2005 | Alliss | |
| 6,952,877 B2 | 10/2005 | Pfaltzgraff | |
| 6,971,223 B2 | 12/2005 | Scott et al. | |
| 7,017,272 B2 * | 3/2006 | Grace | A01D 34/4163 30/275.4 |
| 7,059,106 B2 | 6/2006 | Brandon | |
| 7,302,790 B2 | 12/2007 | Brandon | |
| 7,412,768 B2 | 8/2008 | Alliss | |
| 7,513,046 B2 * | 4/2009 | Proulx | A01D 34/416 30/276 |
| 7,581,322 B2 * | 9/2009 | Proulx | A01D 34/4163 30/276 |
| 7,607,232 B2 | 10/2009 | Pfaltzgraff | |
| 7,624,559 B2 * | 12/2009 | Hishida | A01D 34/902 30/276 |
| 7,640,668 B2 * | 1/2010 | Iacona | A01D 34/4163 30/276 |
| 7,797,839 B2 * | 9/2010 | Proulx | A01D 34/416 30/276 |
| 7,827,771 B2 | 11/2010 | Hishida | |
| 7,966,736 B2 * | 6/2011 | Arnetoli | A01D 34/4163 30/276 |
| 7,979,991 B2 | 7/2011 | Pfaltzgraff | |
| 8,025,249 B2 * | 9/2011 | Alliss | A01D 34/4165 242/388.1 |
| 8,266,805 B1 * | 9/2012 | Alliss | A01D 34/4163 30/276 |
| 8,910,388 B2 * | 12/2014 | Proulx | A01D 34/416 30/276 |
| 2002/0157368 A1 | 10/2002 | Scott et al. | |
| 2004/0148784 A1 | 8/2004 | Grace | |
| 2004/0154276 A1 | 8/2004 | Brandon | |
| 2005/0044725 A1 | 3/2005 | Alliss | |
| 2006/0254060 A1 | 11/2006 | Allis | |
| 2006/0254061 A1 | 11/2006 | Allis | |
| 2008/0120847 A1 | 5/2008 | Aliss | |
| 2008/0168664 A1 * | 7/2008 | Iacona | A01D 34/4163 30/276 |
| 2008/0282554 A1 | 11/2008 | Grace | |
| 2009/0172955 A1 * | 7/2009 | Morris | A01D 34/4163 30/276 |
| 2009/0260237 A1 * | 10/2009 | Alliss | A01D 34/4162 30/276 |
| 2010/0064530 A1 | 3/2010 | Pfaltzgraff | |
| 2010/0154229 A1 * | 6/2010 | Iacona | A01D 34/4163 30/347 |
| 2010/0180451 A1 * | 7/2010 | Reynolds | A01D 34/4163 30/276 |
| 2011/0000091 A1 * | 1/2011 | Proulx | A01D 34/4165 30/276 |
| 2011/0225832 A1 * | 9/2011 | Alliss | A01D 34/4162 30/276 |
| 2011/0239468 A1 * | 10/2011 | Conlon | A01D 34/4163 30/276 |
| 2011/0302791 A1 * | 12/2011 | Proulx | A01D 34/4165 30/287 |
| 2011/0302793 A1 * | 12/2011 | Alliss | A01D 34/4166 30/347 |
| 2001/4013752 | 5/2014 | Paden | |

FOREIGN PATENT DOCUMENTS

| | | |
|---|---|---|
| EP | 2591658 | 8/2014 |
| WO | 2005022975 | 3/2005 |
| WO | 2008/026151 A2 | 3/2008 |
| WO | 2008-053508 A2 | 5/2008 |
| WO | 2008053508 | 5/2008 |
| WO | 2009067184 | 5/2009 |

\* cited by examiner

UNIVERSALLY ADAPTABLE, EASY TO LOAD TRIMMER HEAD WITH FREE ROTATING BUMP KNOB

CROSS REFERENCE TO RELATED APPLICATIONS

This application is a U.S. National Phase Application of International Application PCT Application No. PCT/US13/032284 filed on Mar. 15, 2013, which claims the benefit of priority from U.S. Provisional Application No. 61/758,849 filed on Jan. 31, 2013 and from U.S. Provisional Application No. 61/611,268 filed on Mar. 15, 2012. The disclosures of International Application PCT Application No. PCT/US13/032284 and U.S. Provisional Application No. 61/758,849 and 61/611,268 are incorporated herein by reference.

FIELD OF THE INVENTION

This invention relates generally line-type vegetation trimmer heads for rotary trimmers and, more specifically, to bump-activated trimmer heads for rotary trimmers using monofilament trimmer line as a means for cutting vegetation. More particularly, it relates to easy-load trimmer heads with bump-activated indexing of trimmer line that functions equally well with trimmers that rotate clockwise or counterclockwise. Where bump knobs are used, these trimmer heads may include free-rotating bump knobs.

BACKGROUND OF THE INVENTION

There are a number of different classes of rotary trimmer heads, defined generally by the manner in which the trimmer line is fed, spooled or replaced in the trimmer head and/or by how the trimmer line is discharged, indexed or lengthened during use of the trimmer head. For example, "fixed-line" trimmer heads are one such class and must be manually loaded with regards to line replacement. As the line wears; the consumer manually inserts a new length of trimmer line into a clamp or tortuous line channel, and there is no indexing or lengthening of the line during use. The majority of aftermarket trimmer heads for rotary trimmers that are sold are fixed-line trimmer heads because they are easily designed to be universally adaptable with respect to working with essentially any brand of rotary trimmer, regardless of the operation of the trimmer head or the direction of rotation, as will be explained below.

Another class of rotary trimmer heads is the "self-indexing" trimmer head. With this class of rotary trimmer head, there is only one force that will determine how trimmer line is discharged from the trimmer head—the air drag on the line. For this class of trimmer heads, the housing is connected to the rotating trimmer machine shaft. Self-indexing trimmer heads contain a mechanism to lock and unlock the relative rotation of the spool of trimmer line based upon centrifugal forces, which change the line length. As the line wears, there is less air drag and the rotational speed of the trimmer head increases. With increased rotational speed, the mechanism unlocks the spool. Trimmer line is released, and the trimmer head speed slows due to more air drag on the longer length of trimmer line. The mechanism locks the spool, due to less centrifugal force, and the process repeats. With self-indexing trimmer heads, there is no part that is bumped on the ground and the lengthened or indexing of the line, as the name of this class of trimmer head implies, is controlled entirely by the trimmer head itself. No manual feeding of a new trimmer line is required. This class of trimmer heads is commonly used with electric trimmers that use 50 and 65 mil trimmer line. Importantly, however, the indexing mechanism has to be designed to function with one size of line. Thus, while this works well for an original equipment manufacturer ("OEM") that can control what trimmer line to be purchased by the user, it is often the case that the user may not want to be limited to that particular trimmer line. Unfortunately, aftermarket replacement of these trimmer lines is very difficult and limited by the size of the trimmer line and the rotation/operation of the trimmer line in either the clockwise or counterclockwise direction. Thus, this class of trimmer heads has not been popular with cost-conscious customers who want to use less expensive or larger size lines. Once the line runs out, it must be replaced with the OEM's designated anti size of trimmer line. Hence, if the OEM, which typically sells pre-wound spools of the designated trimmer line for this class of trimmer head, is not big enough or does not have a distribution channel that is large enough to allow the customer to easily obtain and afford to purchase the designated trimmer line, the purchaser of trimmers having this class of trimmer head will not be happy and, thus, this class of trimmer head has not been exceedingly popular.

A third class of trimmer heads is the "bump-feed" or "bump-activated" trimmer heads. Historically, a bump-activated trimmer head has been designed with a bump knob or similar ground contacting member that is mechanically linked to the internal spool in the rotary trimmer head such that both parts (i.e., the bump knob and the internal spool) had the same rotational speed. In doing so, the bump knobs have been known to wear to the point of being useless. For these historical designs, there are two (2) forces together that will determine how the line is discharged from the trimmer head. One, like the self-indexing trimmer head, is the air drag on the line. The second force is the difference in rotational speed between (a) the spool holding a reserve of trimmer line and (b) the housing containing an eyelet from which the line is discharged. The force from air drag helps to pull the line from the head, but it is a minor force in magnitude compared to the force generated due to difference in rotations speeds occurring once the bump knob impacts the ground. Bump-feed trimmer heads have a ground contacting member (called a bump knob) which is mechanically connected to the internal spool within the trimmer head so that the two always have the same rotation speed. When this bump knob contacts the ground for the purpose of releasing more line, the contact with the ground slows the rotational speed of the knob and the spool in concert. The bumping action creates a vertical upward force, lifting the spool upward in the housing. For this brief moment, the spool is no longer locked to the housing, and can rotate independent of the housing. The difference in the rotation speeds between the spool and the housing causes line to be released from or pulled into the head, depending on a) the direction of rotation and b) the winding direction of the line.

There are different types of trimmer heads within the class of bump activated trimmer heads; however, while some of these trimmer heads may be of more than one type. One type is defined as a "universal" bump-activated trimmer head because it is "universally adaptable" to all bump-activated trimmers. That is, a "universal" bump-feed trimmer head is one that can be utilized by a consumer regardless of whether the trimmer head rotates clockwise on the trimmer or rotates counterclockwise on the trimmer. It will be appreciated that the term "bump-feed" and "bump-activated" can be used interchangeably. Given that the market for replacement trimmer heads is driven by existing trimmers that rotate clockwise or rotate counterclockwise, universally adaptable trimmer heads sold as replacements are highly desirable. However, with all bump-feed trimmer heads heretofore, the trimmer head designer and manufacturer has to communicate to the consumer which way to wind the line onto the trimmer head, which is dependent upon which way the trimmer head rotates on the trimmer. This is relatively easy for an OEM, since the OEM already knows the rotational direction of the trimmer machine to which the head is to be connected. Thus, the OEM only needs to communicate the winding direction (i.e., either clockwise or counterclockwise) to the consumer. However, this issue is a communication nightmare for a company making aftermarket trimmer heads for multiple different trimmers. The aftermarket trimmer head manufacturer must communicate how to wind the trimmer line onto a trimmer head for both the clockwise and counterclockwise direction. The aftermarket manufacturer must also rely on the consumer to determine whether the trimmer head will rotate clockwise or counterclockwise on the trimmer as this will determine which way to wind the line, and then also rely on the consumer to wind the line properly based upon the instructions communicated.

This same communication nightmare is even more complicated for the next type of bump-activated trimmer heads, the "easy-load" or "easy-to-load" bump-activated trimmer heads. An easy-load bump-feed trimmer head is a relatively new type of bump-feed trimmer head that has emerged in just the last 15 years. In addition to trying to address the "communication nightmare" defined above, manufacturers have been trying to make winding the trimmer line onto the spool easier for the consumer; hence, the name "easy-load." The challenges of winding trimmer line onto the internal spool and then threading the ends of the line through the eyelets while inserting the spool into the housing have been well documented in the commercial and patent literature. This new class of trimmer head allows line to be loaded into the trimmer head without disassembly of the spool from the trimmer head.

For all previous easy-load bump-feed trimmer heads, there are still the same two (2) forces that will determine how the trimmer line is discharged from the trimmer head, namely (1) the air drag on the line, and (2) the difference in rotational speed between the spool and the housing. However, easy-load type bump-feed trimmer heads generally have two new features not found in other types of bump-feed trimmer heads. Specifically, such trimmer heads have a set of ramps and also have a channel through which trimmer line may pass through. The channel creates a passage way connecting opposite sides of the trimmer head, or at least provides for gripping a strip of line on either side of the spool.

With respect to the ramps, they are placed between the housing and the spool. The user must be able to rotate the spool for the concept to work. In these designs, the user loads the trimmer line into the trimmer head by rotating the bump knob, which is connected to the spool. The vertical wall of the ramp prevents rotation in one direction. The slanted wall of the ramp allows movement in the other direction. It will be appreciated that the trimmer line should be wound in the opposite direction that the trimmer head rotates. The ramp functions well in that the user can rotate the spool in one direction for loading line. But, during this operation, the vertical wall locks the rotation of the spool to the housing until bumped. This eliminates the communication nightmare referenced above and allows loading the line without disassembly of the head.

To make this concept work for trimmers that rotate clockwise and for trimmers that rotate counterclockwise, (i.e., are "universally adaptable") there must be a means to flip the ramps. To solve this problem, manufacturers of these types of trimmer heads have often added two sets of ramps—one for trimmers that rotate clockwise and another set for trimmers that rotate counterclockwise. Unfortunately, this then creates a new communication nightmare, namely, the consumer now has to be instructed how to select the correct ramps based upon the rotational direction of the trimmer.

Some manufacturers have tried to address this issue by selling two separate trimmer heads—one with ramps oriented for trimmers that rotate clockwise, and a second head with ramps oriented for trimmers that rotate counterclockwise. But this just creates another communications issue in that the consumer must know the rotational direction of their trimmer head beforehand. To complicate issues, the direction of rotation is different depending on whether one defines the rotation from above the trimmer head or from below the trimmer head.

With respect to the line channel, there are patents directed toward line channels that go straight through the center of the spool. Because the line channel goes through the middle of the head, this concept limits the type of trimmers to which it can attach. Basically, it is only commercially viable for an OEM of trimmers with short mounting stems.

One or more other patents teach loading line through a trimmer head with a line channel that goes straight through a flange to the center bore of the internal spool. The line travels around the perimeter of this central opening (bore), and then continues again straight to the far side. These patents are more beneficial for aftermarket trimmer heads allowing connection to a wide range of trimmer models.

There is one easy-load bump-feed trimmer head that works a little differently than those discussed above. This easy-load bump-feed trimmer head is capable of discharging trimmer line based upon air drag on the line alone. This trimmer head has tried to decouple the bump knob from the spool. Thus, the interface between the knob and the spool is two flat surfaces designed to slide upon each other. However, in this design, the bump knob is attached to the drive shaft of the trimmer using a bolt and the bump knob is not free-rotating. There is one bump knob with right-handed threads for trimmers that rotate clockwise and another bump knob with reverse threads for trimmers that rotate in the counterclockwise direction. The design forces the bump knob to rotate at the same speed as the housing, which has been shown to also cause wear to the bump knob. And, even though the design allows the spool to rotate independent of the bump knob, there has been found to be a problem in that there is still friction between the two. Because the spool and bump knob are in contact with each other, there is a force created based upon the coefficient of friction between the two interfacing surfaces, and based upon the force of the spring which pushes the spool against the bump knob. This resulting force based upon friction actually works against the force generated by air drag. The amount of force generated by air drag will vary with the drag characteristics of the line (e.g., its shape, length and stiffness). It has also been found that the head does not perform well if the indexing tabs on the spool have to move up the ramps. The head performs better if the indexing tabs are adjacent to the vertical portion of the ramp and bumping action allows movement over and down the ramps.

Yet another problem with this embodiment of the easy-load trimmer head discussed above is that, as the head is used, dirt and grass clippings can collect between the bump knob and the spool, which is open to the ground. Over time, the interface between the spool and the knob will become abraded. This, in turn, will increase the coefficient of friction, which will increase the resistance to the spool movement and make indexing line out of the head more difficult.

Others have attempted to design a bump-activated trimmer head with a free-spinning bump knob which will releases line based solely upon air-drag on the line. However, these other designs are not an easy-load trimmer head. That is, the trimmer head must be disassembled and the spool removed for winding line onto the spool. Then the consumer must reassemble the head while placing the two free ends of line in the slotted eyelets. Additionally, the fastener cannot be easily changed because it is installed before the free-spinning bump knob is assembled. Changing the fastener requires a complex disassembly of the head beyond what is required to replace the line.

Thus, there is a need in the trimmer head industry for a universally adaptable, easy-load bump-activated trimmer head with a free rotating bump knob that functions excellent in both the clockwise and counterclockwise direction. That is, such a trimmer head would ideally be "universally adaptable," utilize air drag as the sole means to incrementally extend the stored trimmer line from the trimmer head when the unit is bump-activated, and be loadable without disassembly of the trimmer head. Such a trimmer head would not create friction between the spool and the bump knob, resulting in a force of friction that works against the air drag created by the trimmer line. And, if need be, the desired trimmer head can easily be disassembled for installing an alternate fastener. Still further, such a trimmer head ideally may have a knob for winding the line onto the internal spool which only functions in one direction due to one set of ramps, thereby eliminating any communication nightmares. The trimmer line should be easily indexed out of the head released regardless of the direction of line rotation.

SUMMARY OF THE INVENTION

In general, a trimmer head for a rotary trimmer according to concepts of the present invention is a line-type vegetation trimmer head, meaning it uses pre-wound monofilament trimmer line stored on a spool within a housing of the trimmer head as a means for cutting vegetation. In at least one embodiment, the trimmer head is also bump-activated, meaning that it has an internal line indexing mechanism that requires a user to intentionally "bump" or otherwise ground a bump knob or other ground contacting member onto the ground to activate the line indexing mechanism, which will thereby release a controlled length of trimmer line. Such a bump-activated trimmer head releases the trimmer line based almost entirely upon air drag on the trimmer line and is negligibly affected by the rotational direction of the bump knob.

In the same or other embodiments, the bump-activated trimmer head of the present invention is universally adaptable to trimmers that rotate in both the clockwise and counterclockwise direction and functions properly regardless of the direction that the trimmer line is wound onto the internal spool. That is, it does not require any special configuration when intended to be operated clockwise or counterclockwise, other than the selection of right-handed or left-handed fasteners for attaching the trimmer head housing to the trimmer. In this manner, the consumer will not have to learn about the internal operation of the trimmer head or learn about the rotational aspects of the trimmer head with respect to the trimmer. The trimmer head is of the "easy-load" type, meaning it does not need to be disassembled when loading a trimmer line and loading of the line is the same every time, regardless of the rotation of the trimmer head on the trimmer.

In addition, the trimmer head advantageously provides a free-rotating (i.e., free-spinning) bump knob, meaning the bump knob itself, while operationally connected to the spool with respect to activation or indexing of the trimmer line, is rotationally independent of the trimmer's rotating shaft, the trimmer head housing and the spool. Thus, in contrast to current bump knobs on other bump-activated trimmer heads, the free spinning bump knob can protect the trimmer head against excessive abrasion, is less likely to wear during use, and is less likely to need replaced after extended use. Further, the bump knobs used in the present invention can spin freely by the use of bearings, or can spin freely without the use of bearings. Still further, a trimmer having a trimmer head with a free-spinning bump knob may see an increase in battery life for battery-powered trimmers or reduced emissions from gasoline-powered trimmers, since the rotational speed of the trimmer is not reduced when the trimmer head come into contact with the ground.

In some embodiments, a vibration free trimmer head may be advantageously aided by the use of an extended shaft that can center the rotation of the spool. In other embodiments, one or more set of ramps may advantageously be used to control both the winding of the trimmer line onto the spool encased within a housing and to direct the indexing function in a clockwise or counterclockwise direction once the lines has been spooled.

In accordance with at least one aspect of the present invention, a bump-activated trimmer head for a rotary trimmer of the type that utilizes wound trimmer line to cut vegetation is provided. The rotary trimmer has a shaft defining a rotation axis. The trimmer head of the present invention comprises a housing attached to the rotary shaft of the rotary trimmer and has at least a pair of opposed eyelets through which the trimmer line is discharged for cutting the vegetation. The trimmer head also includes a spool encased within the housing and having a passageway for the trimmer line, the passageway having opposed ends and extending from one side of the spool to an opposite side. The opposed ends of the passageway are alignable with the opposed eyelets of the housing. The trimmer head further includes an indexing knob external to the housing and operatively connected to the spool for turning the spool for the purpose of winding the trimmer line onto the spool. Finally, the trimmer head includes a bump knob rotating about the same rotation axis as the shaft, wherein the bump knob is operationally connected to the spool, but is rotationally independent of the shaft, the housing and the spool.

In one or more embodiments of the trimmer head above, the bump-activated trimmer may have a housing that includes a main housing and a lower housing plate. The main housing may include a biasing means for compressing the spool against the lower housing plate. In the same or other embodiments, the bump-activated trimmer head may further comprising two sets of projections, wherein one set of projections is located on an interior surface of the housing and the other set of projections is located on the spool. However, in one or more embodiments, at least one of the sets of projections has a ramp portion that is at an offset angle relative to the shaft such that the indexing knob can turn the spool in a direction toward the ramp portion having the offset angle to overcome the biasing means. In one or more embodiments, the ramp portion having the offset angle may be located on the interior surface of the housing. In other embodiments, the ramp portion having the offset angle may be located on the spool. In the same or different embodiments, a portion of the passageway of the spool may be removed from the spool. In the same or different embodiments, the passageway may pass through the rotation axis of the shaft. In other embodiments, the passageway circumvents the rotation axis of the shaft.

In one or more embodiments including or different from those embodiments above, the spool may further comprise at least three flanges essentially parallel to each other. In one such embodiment, the opposed ends of the passageway are located between the same two flanges, and the same two flanges are operationally connected by at least one inclining portion on one of the two flanges and at least one opening on the other of the two flanges. This embodiment allows passage of the trimmer line up the at least one inclining portion, through the at least one opening, and into a space defined by the flange having the at least one opening and the third flange.

In a more specific embodiment of that noted above, the spool may include three flanges parallel to each other, wherein the opposed ends of the passageway are located between a first flange and a middle flange. The first flange can include two inclining portions positioned about 180 degrees opposite each other relative to the circumference of the first flange, while the middle flange can include two openings in alignment and essentially contiguous with the two inclining portions of the first flange. As such, when the indexing knob is turned and the spool rotated, the trimmer line extending from each of the opposed eyelets of the housing is wound between the first and middle flange, up the inclining portions of the first flange, through the openings of the middle flange, and into a space between the middle flange and the third flange.

In an alternative embodiment, the spool may include four flanges parallel to each other, wherein the opposed ends of the passageway are located between the two middle flanges. In this embodiment, a first middle flange includes an inclining portion and an opening located about 180 degrees opposite each other relative to the circumference of the first middle flange, while the second middle flange includes an opening in alignment and essentially contiguous with the inclining portion of the first middle flange and an inclining portion in alignment and essentially contiguous with the opening of the first middle flange. As such, where the indexing knob is turned and the spool rotated, the trimmer line extending from one of the opposed eyelets of the housing is wound between the first and second middle flanges, up the inclining portion of the first middle flange, through the opening of the second middle flange, and into a space between the second middle flange and a first outer flange, while the trimmer line extending from the other of the opposed eyelets of the housing is wound between the first and second middle flanges, up the inclining portion of the second middle flange, through the opening of the first middle flange, and into a space between the first middle flange and a second outer flange.

In the same or other embodiments, the indexing knob may be integrally connected to the spool as one piece. In alternative embodiments, the indexing knob is connected to the spool by screws.

In the same or different embodiments, the trimmer head may further comprise a bearing assembly positioned between the spool and the lower housing plate, wherein the bearing assembly operationally connects the bump knob to the spool and allows the bump knob to rotate independently of the spool. In a more specific embodiment, the bearing assembly includes a plurality of ball bearings resting in depressions molded into a bearing plate. In an alternative embodiment, the bump knob may have a snap-fit connection to another part of the trimmer head and does not include the use of a bearing assembly to allow the bump knob to rotate independently of the spool. Such other part may be the indexing knob.

In accordance with another aspect of the present invention, a spool for use in a trimmer head of a rotary trimmer having trimmer line is provided. In one or more embodiments, the spool comprises at least three flanges essentially parallel to each other. A passageway for the trimmer line is located between two of the flanges, the passageway having opposed ends and extending from one side of the spool to an opposite side. The spool includes at least one inclining portion on one of the two flanges about which the passageway is located and at least one opening on the other of the two flanges about which the passageway is located. Each opening is in alignment and essentially contiguous with each inclining portion. Hence, the trimmer line may be wound onto the spool from the opposed ends of the passageway, between the two flanges about which the passageway is located, up the at least one inclining portion, through the at least one opening, and into a space defined by the flange having the at least one opening and the third flange.

In a more specific embodiment, the spool may include three flanges. In this embodiment, the opposed ends of the passageway are located between a first flange and a middle flange. The first flange includes two inclining portions positioned about 180 degrees opposite each other relative to the circumference of the first flange, and the middle flange includes two openings in alignment and essentially contiguous with the two inclining portions of the first flange. As such, when the spool rotated, the trimmer line extending from each of the opposed ends of the passageway is wound between the first and middle flange, up the inclining portions of the first flange, through the openings of the middle flange, and into a space between the middle flange and the third flange.

In yet another embodiment, the spool may include four flanges essentially parallel to each other. Opposed ends of the passageway are located between the two middle flanges and a first middle flange includes an inclining portion and an opening located about 180 degrees opposite each other relative to the circumference of the first middle flange. The second middle flange includes an opening in alignment and essentially contiguous with the inclining portion of the first middle flange and an inclining portion in alignment and essentially contiguous with the opening of the first middle flange. As such, when the spool rotated, the trimmer line extending from one of the opposed ends of the passageway is wound between the first and second middle flanges, up the inclining portion of the first middle flange, through the opening of the second middle flange, and into a space between the second middle flange and a first outer flange, while the trimmer line extending from the other of the opposed ends of the passageway is wound between the first and second middle flanges, up the inclining portion of the second middle flange, through the opening of the first middle flange, and into a space between the first middle flange and a second outer flange.

BRIEF DESCRIPTION OF THE DRAWINGS

For a full understanding of the invention reference should be made to the following detailed description and the accompanying drawings, wherein.

DETAILED DESCRIPTION OF THE ILLUSTRATIVE EMBODIMENTS

The present invention is directed towards various embodiments of a bump-activated trimmer head for a rotary trimmer of the type that utilizes wound trimmer line to cut vegetation. The various embodiments of the trimmer heads of the present invention are all designed to include (1) a free-rotating or free-spinning bump knob or ground contact member, and (2) an internal line channel or passageway to guide the trimmer line from a first eyelet in the housing to an opposite, second eyelet in the housing approximately 180 degrees away from the first eyelet relative to the circumference of the housing, making it possible to load the trimmer line into the trimmer head without disassembly of the trimmer head. Having a free-rotating bump knob has the advantage that the bump knob will last longer due to less abrasion with the ground. Including a line channel or passageway in the design allows for easy loading of the trimmer line by the consumer without having to disassemble the trimmer head.

Advantageously, each embodiment of the trimmer head utilizes air drag as essentially the sole means to incrementally extend the trimmer line from the trimmer head when the unit is bump-activated, and can function in rotary trimmers that have trimmer heads that rotate clockwise or in rotary trimmers that have trimmer heads that rotate counterclockwise. In most embodiments, a set of ramps or angled portions may be used to control the direction of winding the trimmer line onto the internal spool. These ramps and the design of the trimmer head provide for consistency with regard to the winding of the trimmer line regardless of whether the trimmer head rotates clockwise or counterclockwise on the rotary trimmer shaft. This is advantageous because, unlike most bump-activated trimmer heads, the consumer does not have to choose between two setup options. And, because the trimmer head functions equally well in either the clockwise or the counterclockwise directions, it can be offered as a replacement head in the retail aftermarket.

Figure 1:
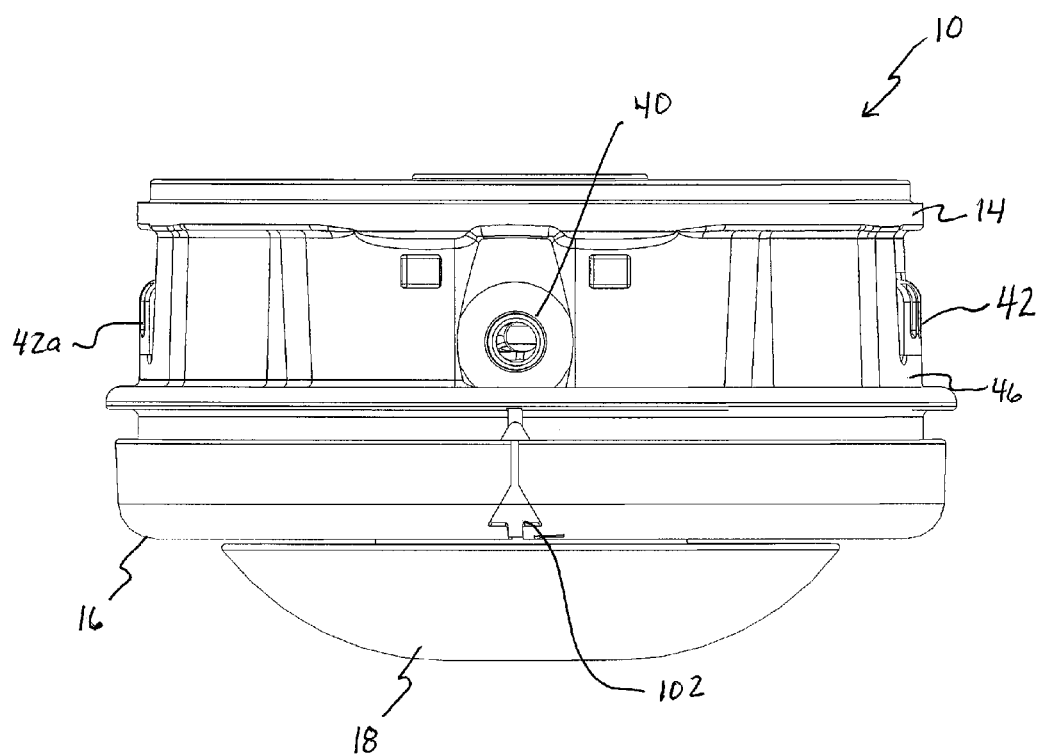
FIG. 1 is a side elevation view of one embodiment of a trimmer head according to the concepts of the present invention.
Figure 2:
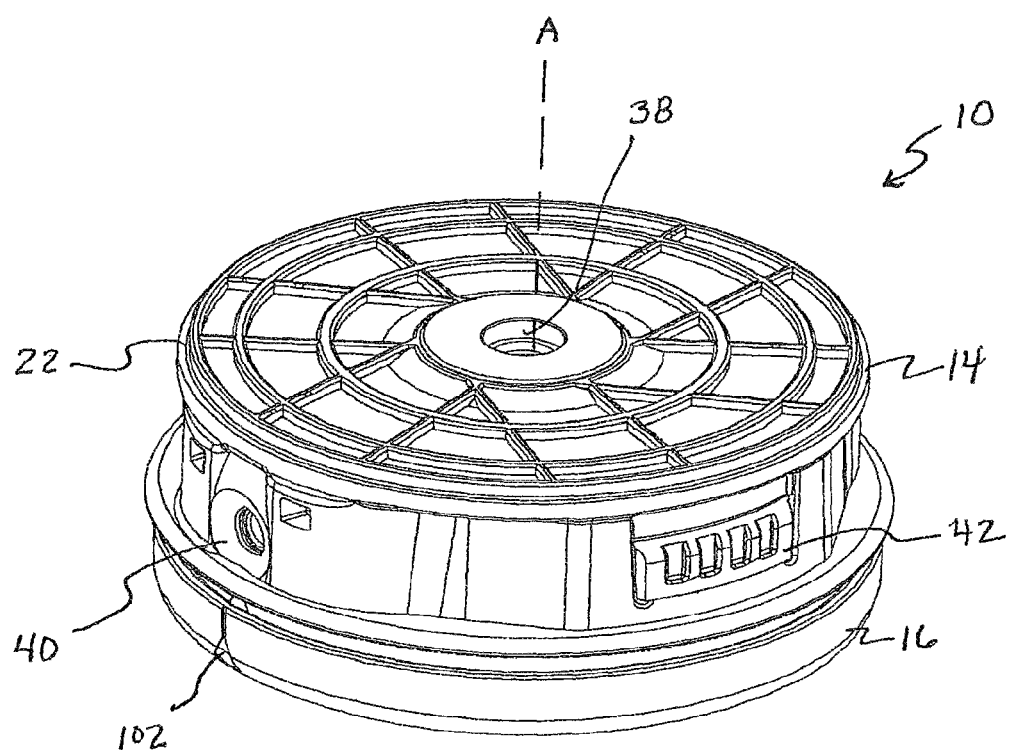
FIG. 2 is a perspective view of the trimmer head of FIG. 1 taken from above the trimmer head.
Figure 3:
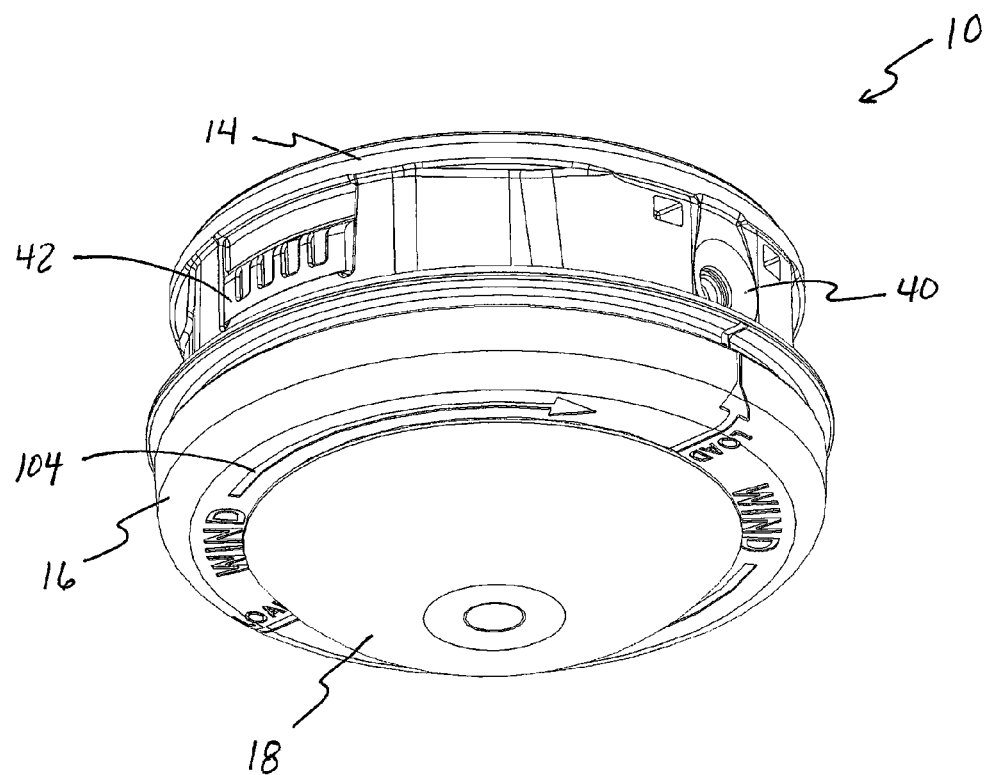
FIG. 3 is a perspective view of the trimmer head of FIG. 1 taken from below the trimmer head.
Figure 4:
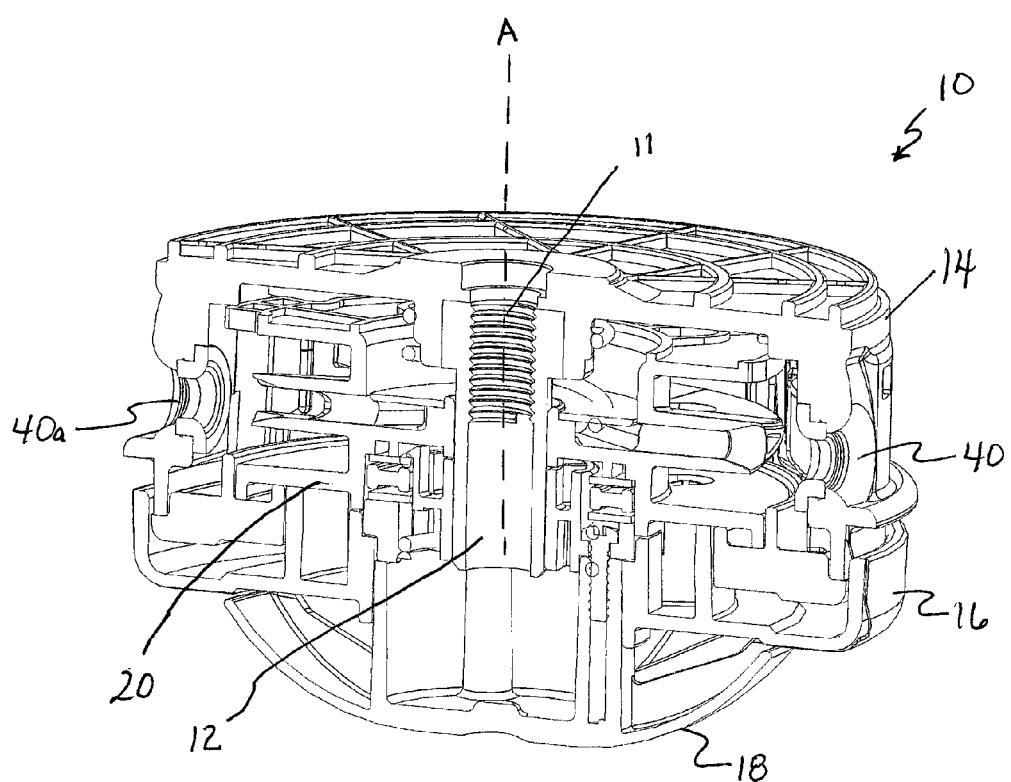
FIG. 4 is a sectional perspective view of the trimmer head of FIG. 1.

One representative embodiment of a trimmer head according to the concepts of the present invention is designated generally by the numeral 10 in FIGS. 1 to 4 herein. As best seen in FIG. 4, the trimmer head 10 is designed to be attached to a shaft of a rotary trimmer (not shown) using threads 11 located on the inside of a shaft extension 12. As such the shaft of the rotary trimmer and the shaft extension 12 define an axis A of rotation around which the trimmer head and its various parts spin. The rotary trimmer itself can be powered by any power source known in the art, including by electricity, battery, gasoline, or other fuels. Electric and battery trimmers are of particular interest because of the growing demand for battery powered outdoor power tools. Unfortunately, battery life is a noticeable product attribute, especially when the battery runs out of power prior to completing the task. The invention discussed below will result in more efficient use of the power available from batteries and other power sources.

As seen in the drawings, the trimmer head 10 generally includes a housing 14, an indexing knob 16 and a bump knob 18. A spool 20 is also generally included in the trimmer head 10 of the present invention. Bump knob 18 is unique in that it is free spinning from the housing 14 or any of the other major components of the trimmer head 10. That is, the bump knob 18 is free to rotate about the same axis A of rotation as the trimmer shaft and shaft extension 12 above, and does so independently of the shaft, shaft extension 12, housing 14, indexing knob 16, or spool 20.

Figure 5:
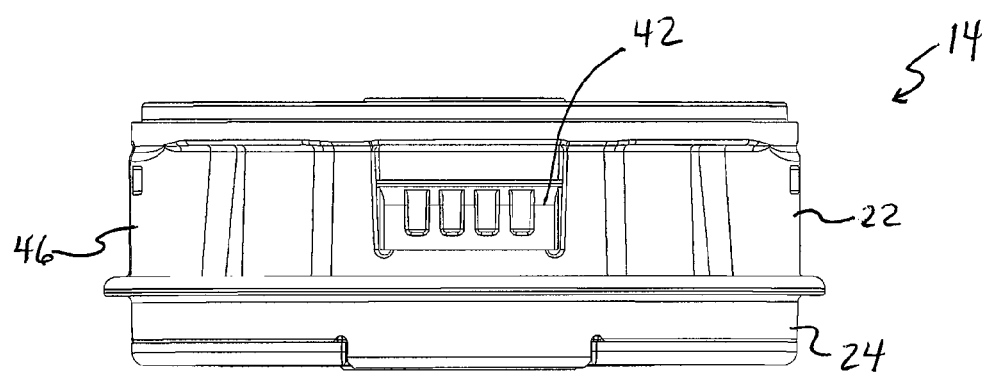
FIG. 5 is a side elevation view of the main housing and lower housing plate of the trimmer head of FIG. 1.
Figure 6:
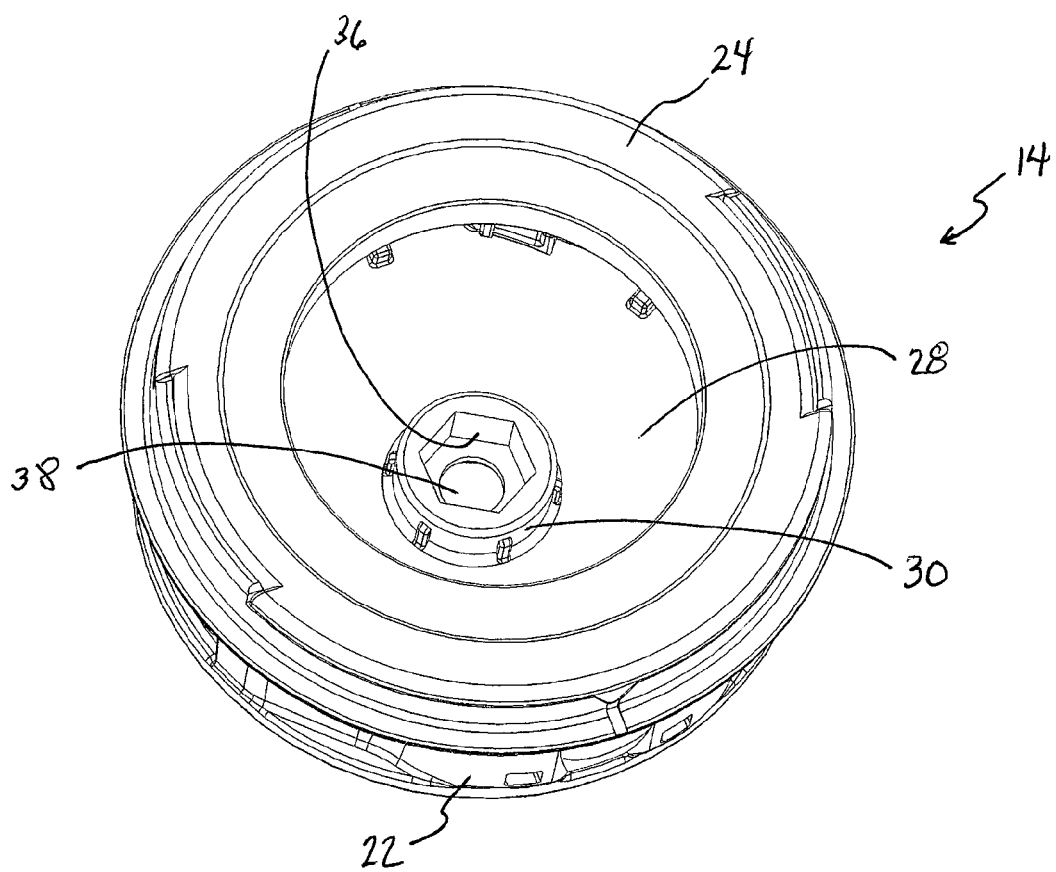
FIG. 6 is a perspective view of the main housing and the lower housing plate of FIG. 5 taken from below the lower housing plate.
Figure 7:
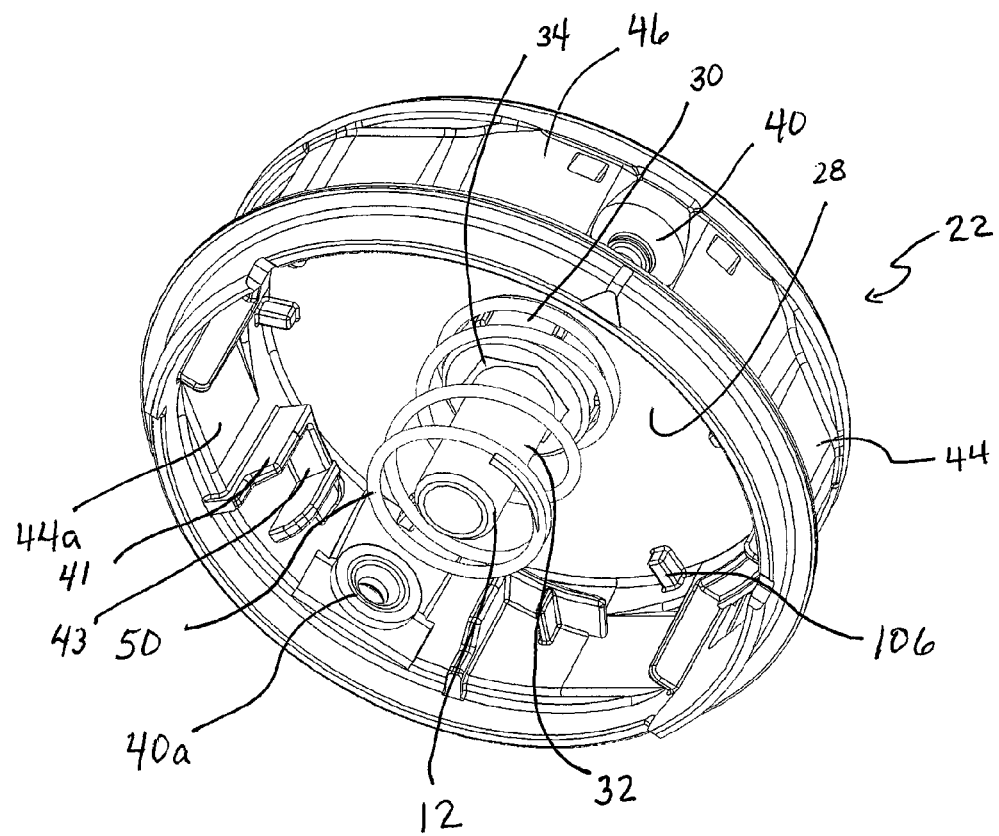
FIG. 7 is a perspective view showing the interior of the main housing of the trimmer head of FIG. 1.

One representative form of the housing is designated generally by the numeral 14 in FIGS. 5 and 6. Housing 14 includes a main housing 22 and a lower housing plate 24. The main housing 22 and lower housing plate 24 define the internal volume of the housing 14 and encase at least the spool 20 therein. As best seen in FIGS. 6 and 7, it will be appreciated that housing 14 is attached to the rotary shaft of a rotary trimmer by shaft extension 12 that fits into bore 36 defined by a raised portion 30 on the top interior surface 28 of the main housing 22. More specifically, the shaft extension 12 is hollow for receiving the rotary trimmer shaft and includes a body portion 32 generally cylindrical in shape and a head portion 34 that is generally hexagonal in shape. The head portion 34 of the shaft extension 12 is seated in a hexagonal cavity 36 recessed within the raised portion 30. An opening 38 is provided in a top surface 40 of the main housing 22 to allow the rotary trimmer's shaft therethrough and to be threadably connected to the shaft extension 12 positioned in the hexagonal cavity 36 within the interior of the housing 14. As such the trimmer shaft is positioned in the radial center of the trimmer head 10 to provide a vibration-free trimmer head along the axis A of rotation.

As further shown in the drawings, the housing 14 includes a pair of opposed eyelets, 40, 40a through which a trimmer line (not shown) may be discharged during cutting of vegetation: The eyelets 40,40a are shown to be round, but may take any shape useful in the art, including, for example, oval shaped. The eyelets 40, 40a are shown as located on the main housing 22.

Referencing FIG. 7, it will be appreciated that the main housing 22 has at least one set of projections 41 and 43 on the interior of its sidewall 46. In one embodiment, there may be as many as four sets of such projections 41 and 43. Notably, one of the projections is angled essentially parallel to the shaft extension 12, i.e., parallel to the axis A, while the other of the projections is set forth at an offset angle from axis A, such that this projection will act like a ramp when the spool is forced into contact with this projection upon manually rotating the indexing knob 16 or being activated by the bumping motion necessary to index the trimmer line through the spool for discharge through the eyelets 40, 40a.

With reference to FIGS. 2, 3 and 5, it will be appreciated the lower housing plate 24 includes tabs 42, 42a at opposite sides of the lower housing plate 24 relative to the circumference of the housing 14. These tabs 42, 42a extend upwardly into the interior of the main housing 22, to be received by openings 44, 44a (shown in FIG. 7) in the sidewall 46 of the main housing 22. Thus, tabs 42, 42a are used to hold the lower housing plate 24 to the main housing 22.

It will be appreciated that indexing knob 16 essentially covers the lower housing plate 22. Thus, lower housing plate 22 is not visible, except for the tabs 42, 42a, when the trimmer head 10 is functional.

Figure 8:
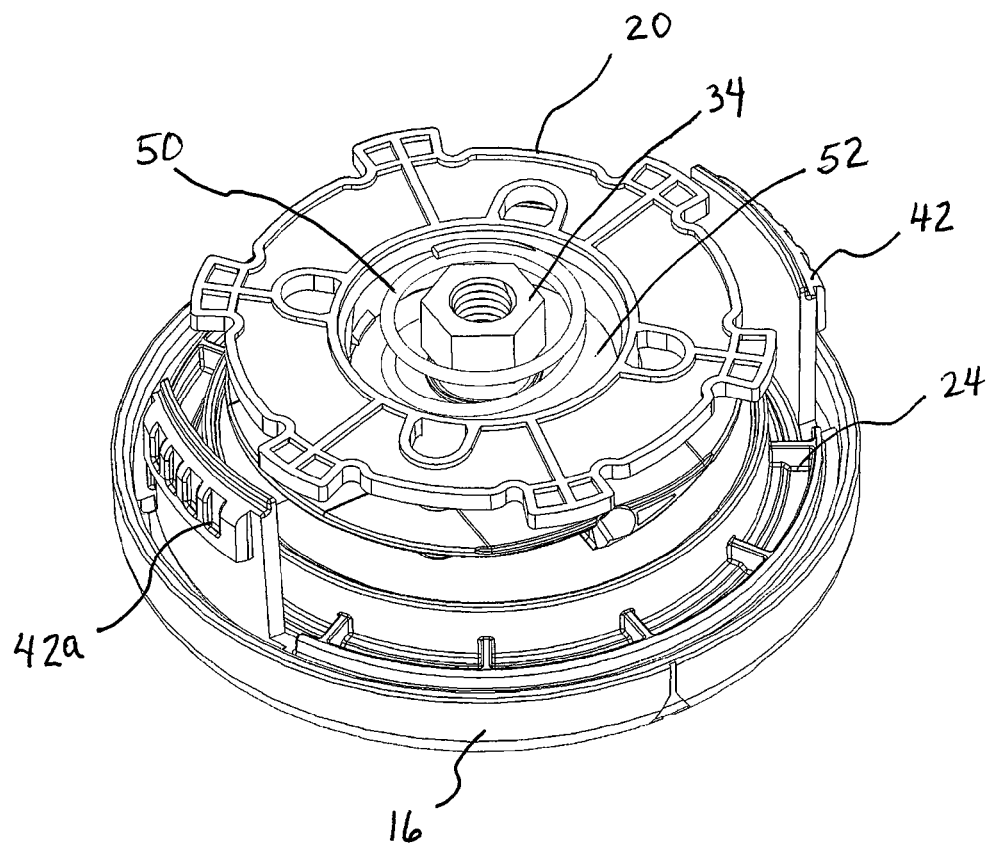
FIG. 8 is a perspective view of the spool assembled to the indexing knob and lower housing plate of the trimmer head of FIG. 1.

As noted above, the main housing 22 and the lower housing plate 24 encapsulates the spool 20. FIG. 8 shows the trimmer head 10 of the present invention with the main housing 22 removed so as to show the spool 20 and other parts located within the housing 14. Thus, FIG. 8 shows the spool 20 assembled and operationally connected to the indexing knob 16, with the lower housing plate 24 disposed radially between the spool 20 and the indexing knob 16. The head portion 34 of the shaft extension 12 and a biasing spring 50 positioned around the shaft extension (see also FIG. 7) are also shown. The spring 50 rests on a washer 52 in the center bore of the spool to compress the spool 20 against the lower housing plate 24.

Figure 9:
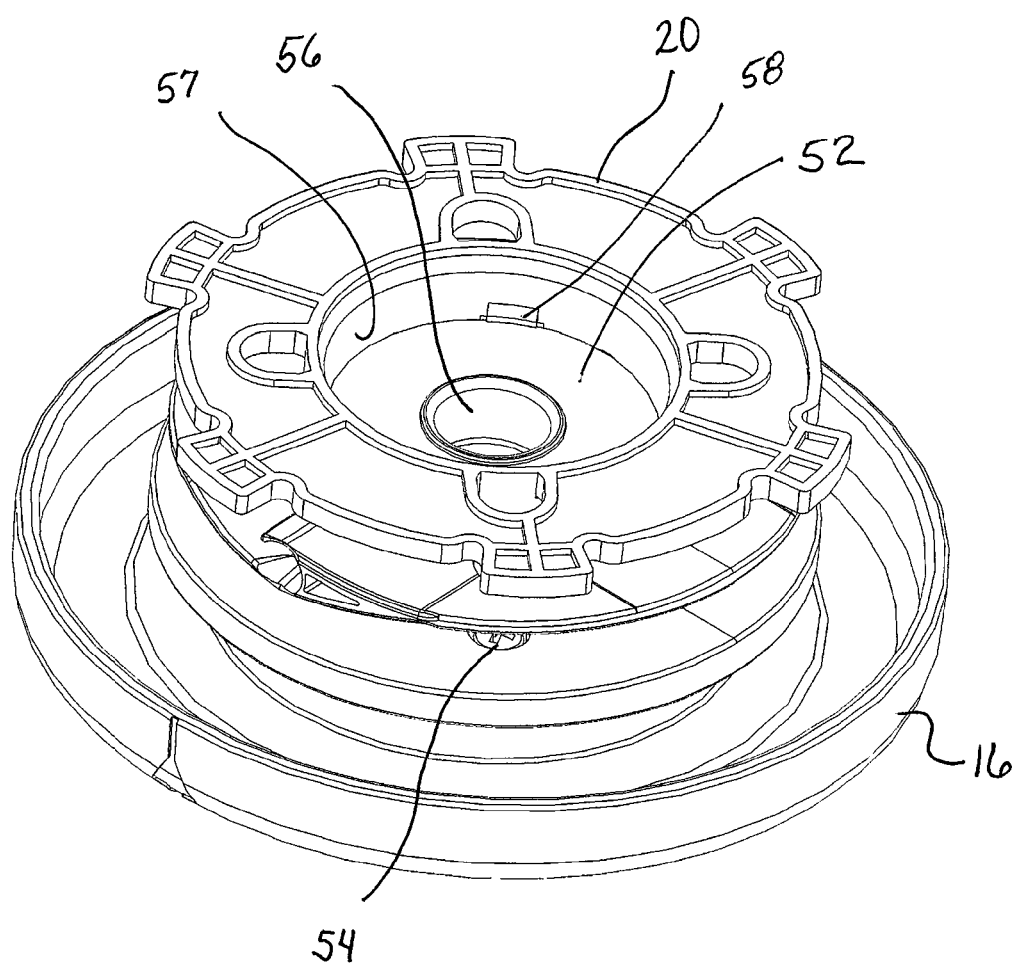
FIG. 9 is a perspective view of the spool assembled to the indexing knob without the lower housing plate of FIG. 8.
Figure 10:
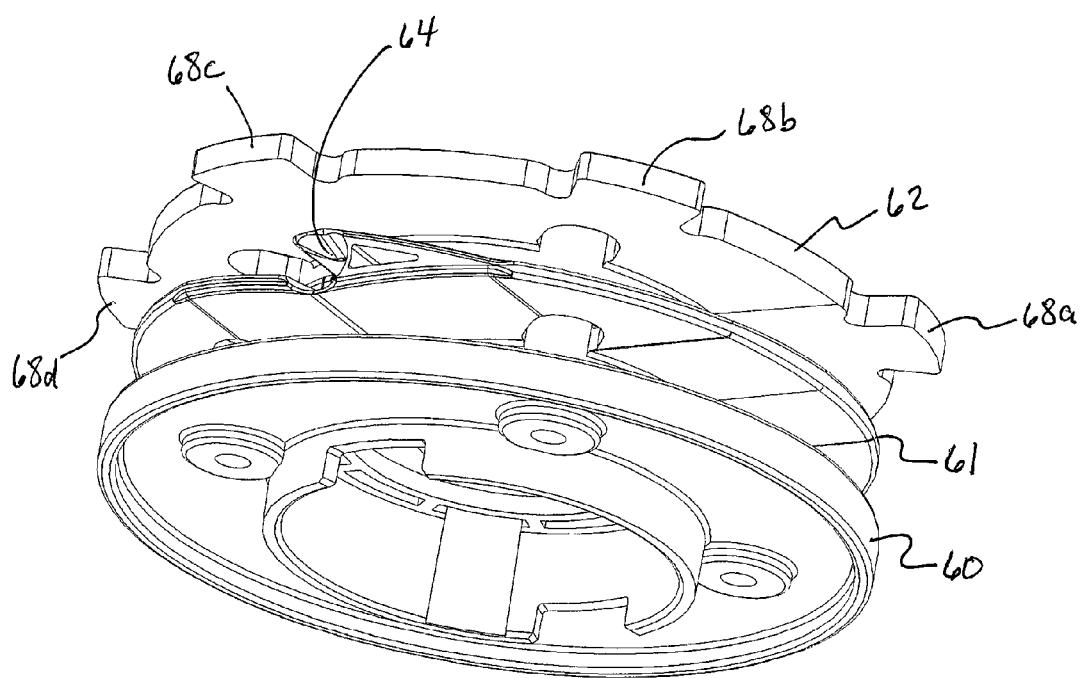
FIG. 10 is a perspective view of the spool of the trimmer head in accordance with the concepts of the first embodiment taken from below the spool.
Figure 11:
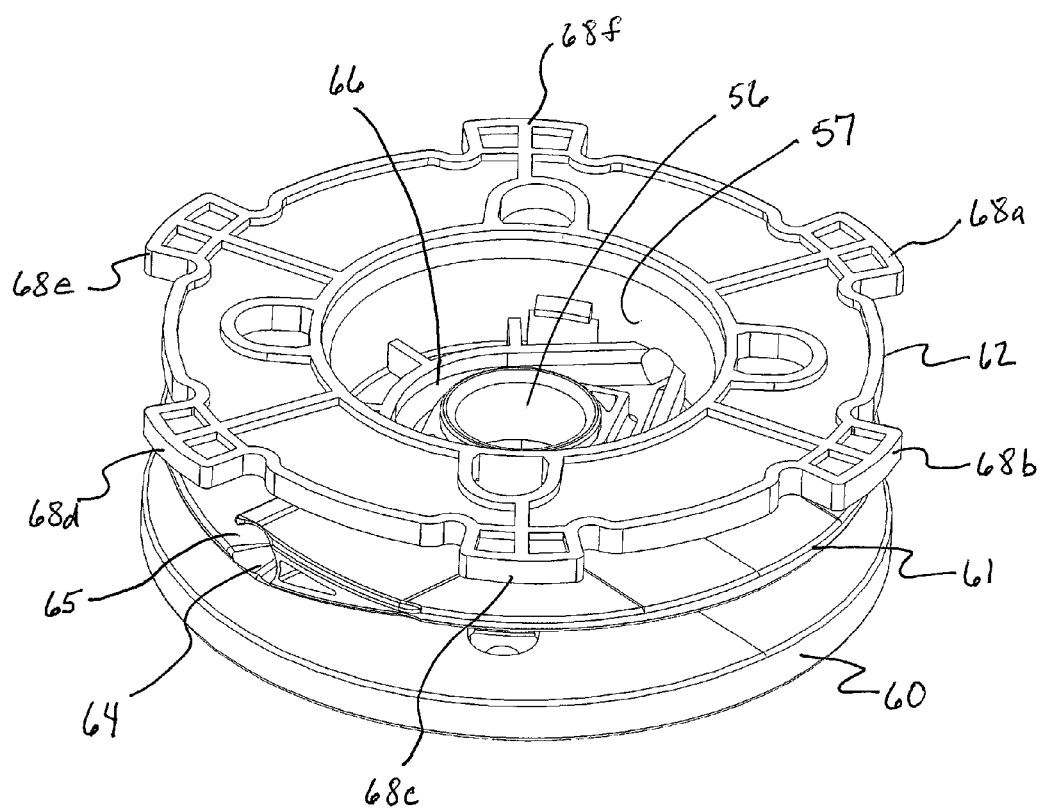
FIG. 11 is a perspective view of the spool of FIG. 10 taken from above the spool.

FIG. 9 shows the spool 20 assembled to the indexing knob 16 without the lower housing plate, shaft extension or biasing spring present. In this figure, it can be seen that the spool 20 is connected by a fastening means, such as by one or more screws 54, to the indexing knob. 16. As more particularly shown in FIGS. 10 and 11, the spool 20 has four openings for mounting screws, which will connect to the indexing knob.

As shown in FIGS. 9 to 12, the spool has a central bore 56, which accommodates the shaft extension 12, and a central barrel 57 larger than the central bore 56. The central barrel 57 is large enough for receiving the washer 52, which has been removed in FIGS. 11-12. The washer 52 is held in place by clips 58.

Notably, the spool has at least three flanges, namely a lowermost first flange 60, a middle flange 61, and an uppermost third flange 62. There are two line channel openings 64, 64a on opposite sides of the middle flange 61. Notably, one of the line channel openings 64 has a gap 65 that opens to the space between the middle flange 61 and the uppermost flange 62. The other of the line channel openings 64a has a gap 65a that opens to the space between the middle flange 61 and the lowermost flange 60. In this manner, the three flanges together define two sections for holding the trimmer line.

The two line channel openings 64, 64a are connected to each other by a passageway 66 so that the trimmer line can travel from one eyelet 40 of the housing 14 to the other eyelet 40a of the housing 14 when the line channel openings 64, 64a are aligned with the eyelets 40, 40a in the housing 14. The uppermost third flange 62 has six equally spaced tabs 68a through 68f, located along the perimeter of this flange 62.

Figure 12:
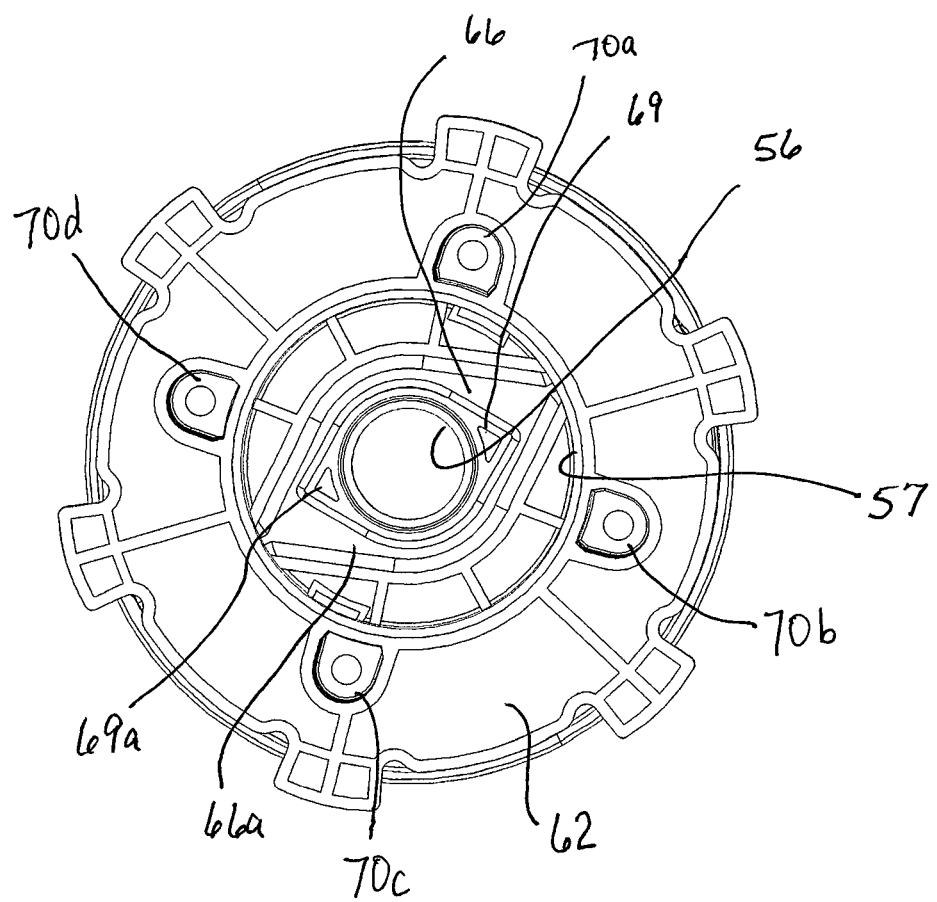
FIG. 12 is a top plan view of the spool of FIG. 10 showing part of the passageway for the trimmer line.

In FIG. 12, the internal passageway 66 is visible. In actuality, there may be a pair of passageways 66, 66a for the trimmer line to travel, depending upon which direction around the central bore 56 the trimmer line travels. A diamond shaped portion acts a line diverter means 69, 69a to guide the line around the central bore 56 of the spool 20. The line channels openings 64, 64a in the middle flange of the spool 20 connect to the internal passageway 66, 66a through the spool 20 and around the central bore 56. Thus, when the ends of the line channel openings 64, 64a are aligned with the eyelets 40, 40a of the housing 14, it is possible for the user to push a trimmer line through the first eyelet 40 and into the first line channel opening 64. The trimmer line will then enter the internal passageway 66. Upon impacting the line diverter 69, the trimmer line will travel around to the right side of the central bore 56 when viewed from above. The line will then continue through the passageway 66 until it is exposed through the other line channel opening 64a, wherein it will then exit through the opposite eyelet 40a. It is also possible to thread the trimmer line from the opposite direction.

Figure 13:
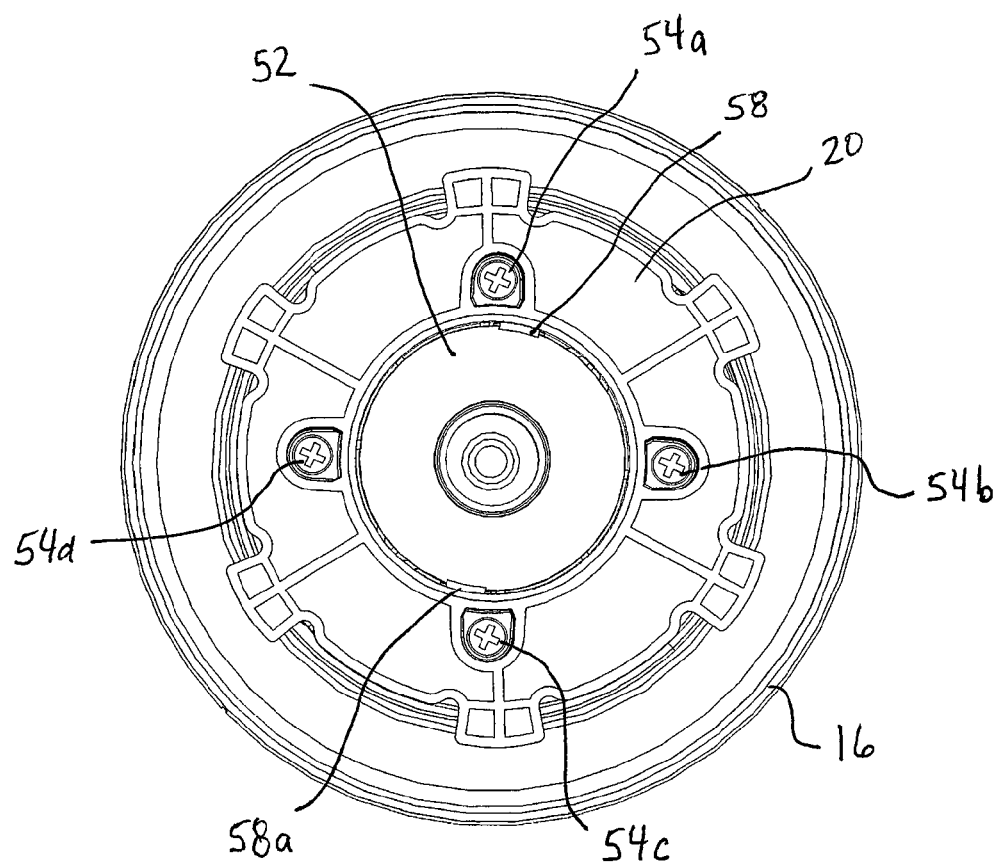
FIG. 13 is a top plan view of the spool and indexing knob according to the concepts of the first embodiment showing the washer and screws for attaching the spool to the indexing knob.

With reference to FIGS. 12-13, the spool 20 further comprises four channels 70a through 70d, that allow for installing four fasteners such as screws, 54a through 54d, into the lower flange (see also FIG. 9). When the spool 20 is assembled to the indexing knob 16, the lower housing plate 24 is sandwiched and captured in between the two (see FIG. 8). The lower housing plate 24 can be freely rotated independent of the spool 20, which is screwed or otherwise fastened to the indexing knob 16. When the lower housing plate 24 is connected to the main housing 22, the spool 20 is held in the internal volume of the trimmer head 10. The shaft extension 12 will keep the spool 20 centered in the internal volume of the trimmer head 10. The biasing spring 50 that is installed over the shaft extension 12 and between the spool 20 and the main housing 22, keeps the spool 20 biased in the downward position against the lower housing plate 24.

Figure 14:
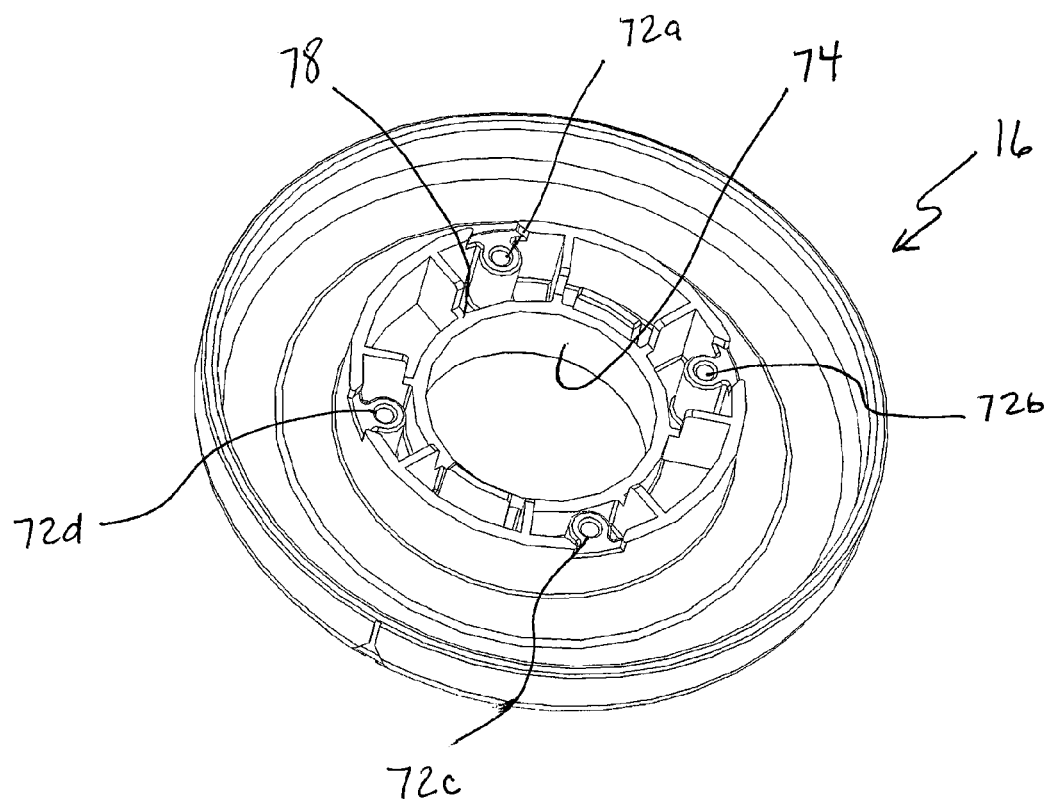
FIG. 14 is a perspective view of the indexing knob of the trimmer head of FIG. 1 taken from above.

The indexing knob 16 is shown throughout the various drawings, but is shown separately in FIG. 14. It will be appreciated that the four channels 70a through 70d in the spool 20 are aligned with four channels, 72a through 72d, in the indexing knob for receiving the four screws (54a through 54d) which are used to connect the indexing knob 16 to the spool 20. There is also a central opening 74 which is the passage for the central shaft 84 on the bump knob 18. The user can manually rotate the internal spool 20 by turning this indexing knob 16. This action is necessary for winding the trimmer line onto the internal spool 20. Along the perimeter of the central opening 74 is a lip or ledge 78. This ledge 78 supports the lower side of a bearing coupling 80 to be shown later.

Figure 15:
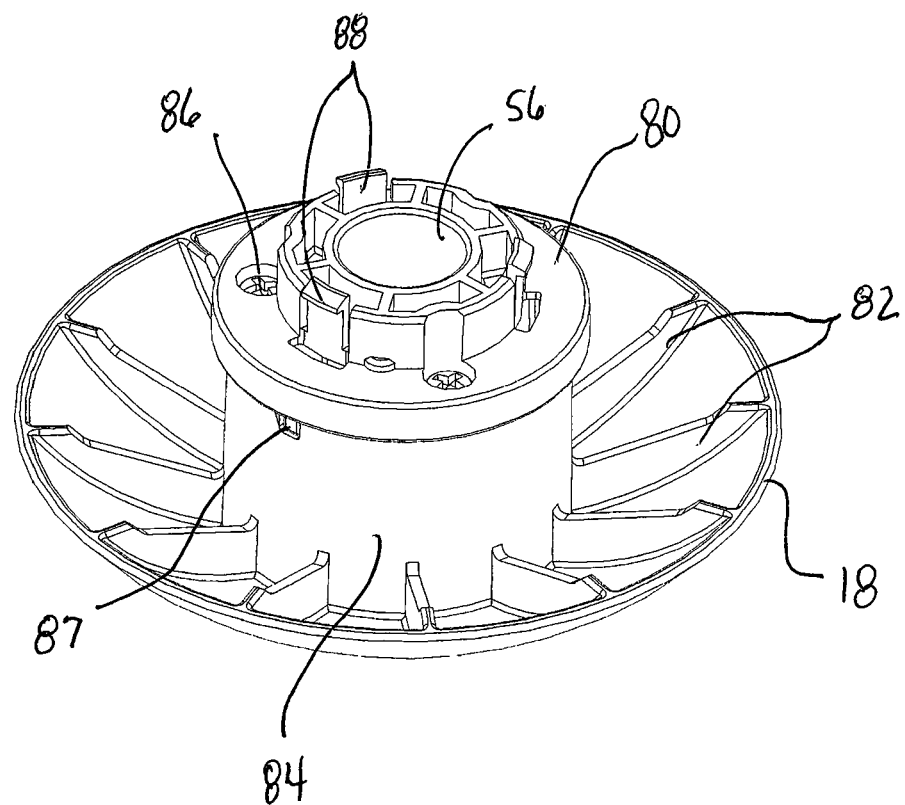
FIG. 15 is a perspective view of the bearing coupling attached to the bump knob of the trimmer head of FIG. 1, taken from above.

The bump knob 18 is also shown throughout the various drawings is depicted with a bearing coupling 80 in FIG. 15. The bump knob 18 may be reinforced with ribs 82 to maintain its shape upon impact with the ground. There is a central shaft 84 with an outer diameter sized slightly smaller than the inner diameter of the central opening 74 located on the indexing knob 16. The shaft 84 includes three passageways for receiving three screws 86 that are used to connect the bump knob 18 to the bearing coupling 80. The bump knob 18 also has three slots 87 for fixing the bump knob 18 to the bearing coupling 80. The interlocking of the slots 87 with the projections 89 on the bearing coupling 80 provides for a secure connection between the bearing coupling 80 and the bump knob 18.

Figure 16:
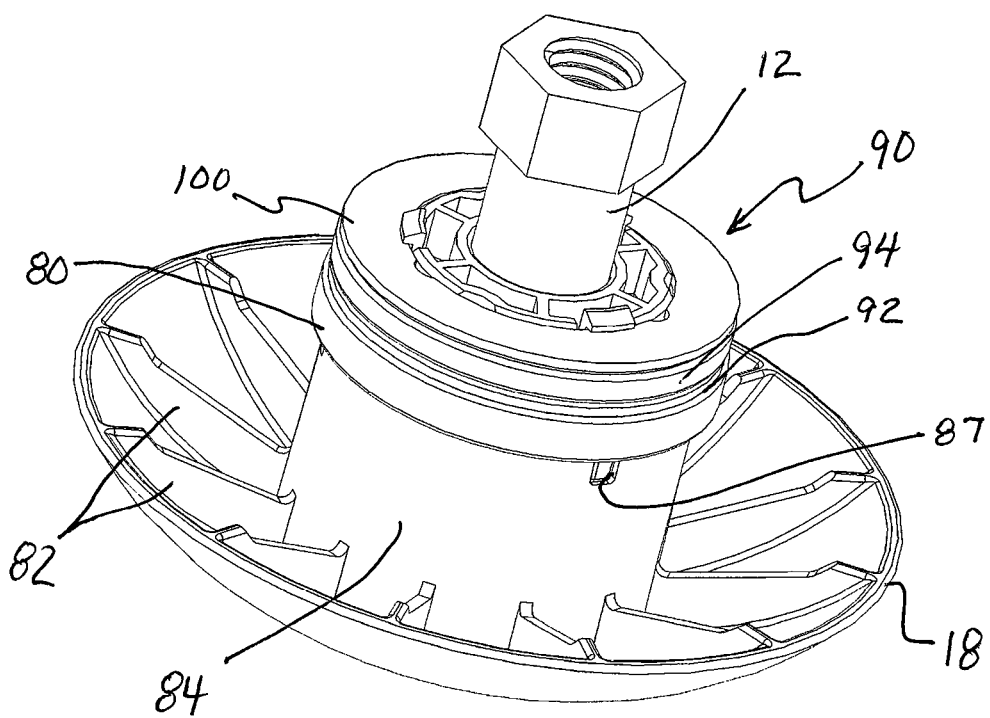
FIG. 16 is a perspective view of the bearing assembly attached to the bump knob of the trimmer head of FIG. 1, taken from above.
Figure 17:
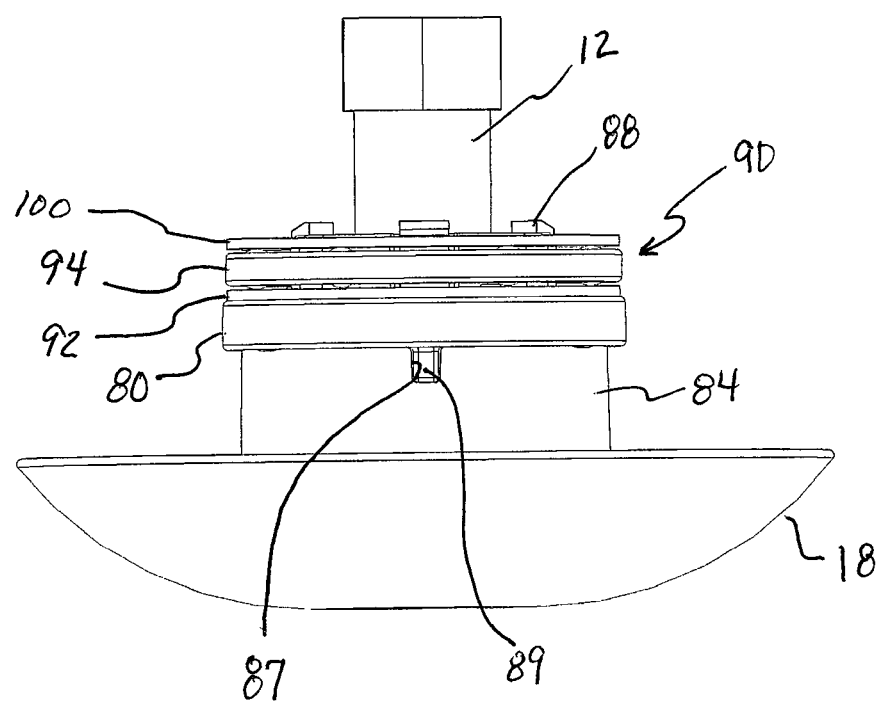
FIG. 17 is a side elevation view of the bearing assembly attached to the bump knob of the trimmer head of FIG. 1.
Figure 18:
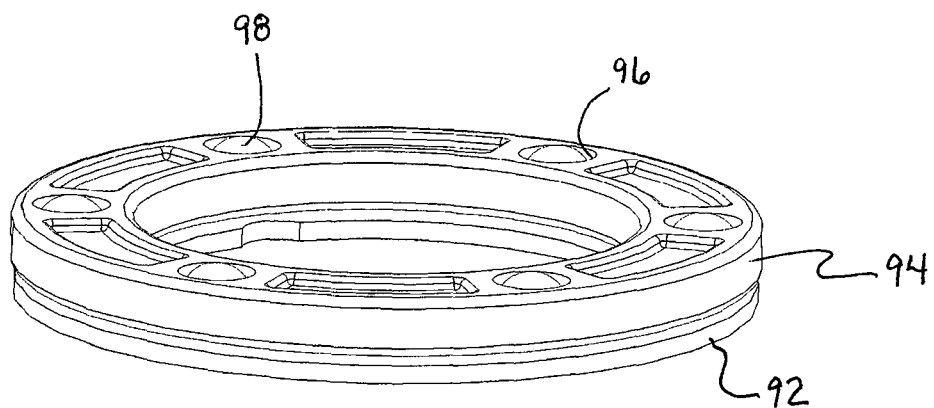
FIG. 18 is a perspective view of the bearing ring used in the trimmer head of the first embodiment.
Figure 19:
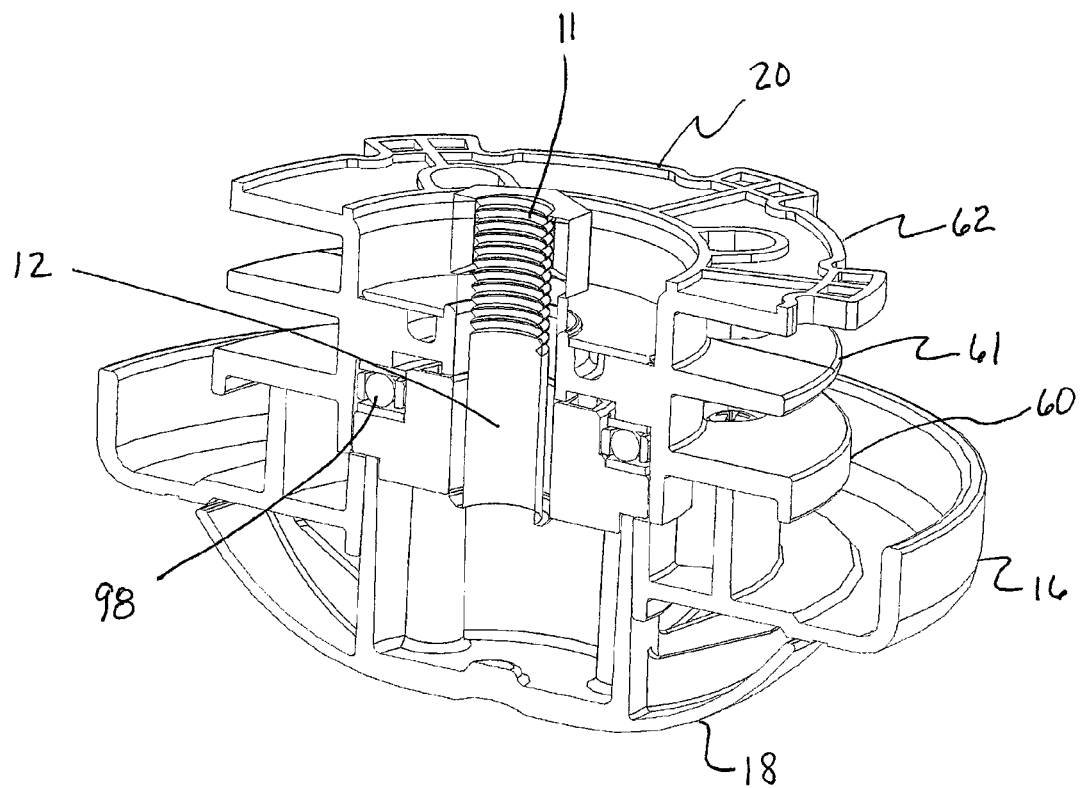
FIG. 19 is a section perspective view of the bump knob, bearing assembly, indexing knob, spool and shaft extension of the trimmer head of FIG. 1.

Also, as shown in FIG. 15, there are three clips 88 extending upward from the bearing coupling. The rest of the bearing assembly, shown generally in FIGS. 16 and 17, as 90, is held in place by these three clips 88. FIG. 16 shows the bearing assembly (26) installed to the top of the bump knob 18. Installed adjacent to and on top of the bearing coupling 80 is the lower bearing raceway 92. On top of the lower bearing raceway is a bearing ring 94 which has six equally spaced openings 96 for receiving ball bearings 98. On top of the bearing ring 94 is the upper bearing raceway 100. The center of the bearing assembly 90, including the center of the bearing coupling 80, has a central bore 56 for receiving the shaft extension 12. The shaft extension fits into this central bore 56 and helps to center the rotation of the bearing assembly 90 and the bump knob 18. Again, this is important for reducing vibration.

The bearing assembly 90 notably permits the bump knob 18 to rotate freely and independently from the spool 20. When the user bumps the trimmer head 10 on the ground, the bump knob 18 is the ground contacting member. Contact with the ground will cause the bump knob 18 to slow its rotational speed, possibly even stopping the rotation of the bump knob 18 depending on the length of the contact with the ground. The bearing assembly 90 allows the remainder of the trimmer head 10 to continue to rotate at the same speed as the shaft speed of the trimmer with negligible slowing of the rotational speed of the trimmer head and trimmer. In fact, the user can rest the bump knob 18 of this invention on the ground without slowing the rotational speed of the trimmer head 10, which is a benefit in that it allows the ground to support part of the weight of the trimmer. Another benefit is that power is not wasted because the speed and momentum of the trimmer head is lot lost when bumped or indexed.

Heretofore, the prior art has not used a bearing assembly such as 90 to decouple the rotational speed of the bump knob 18 from the spool 20 in combination with easy-loading capability. For trimmer heads in the prior art with easy-loading capability, the bump knob has been either rotationally locked to the spool or rotationally locked to the drive shaft of the trimmer. As a result, when a prior art trimmer head is bumped on the ground, the contact with the ground slows the rotational speed of the bump knob 18, which in turn slows the rotational speed of the internal spool 20. When the rotational speed of an internal spool is locked with the rotational speed of the main housing, any contact with the ground places increased demand on the power supply connected to the trimmer. If the power supply is a battery, then trimmer heads of the prior art which do not have bearings will result in more electrical power demand from the battery and thus result in reduced battery life. If the power supply is gas, then energy is lost due to the resistance to rotation resulting from contact with the ground.

The present invention can allow the bump knob 18 can rest on the ground to the point of the bump knob 18 reaching a full stop without causing a significant increase in power demand from the battery. Accordingly, one of the benefits of the present invention is better utilization of the power stored in rechargeable batteries for battery operated trimmers. And, even for corded electric trimmers or gas-powered trimmers, with the present invention, power usage is more efficient than with trimmer heads where the bump knob is connected to the spool without a bearing surface.

It will be appreciate that the portion of the trimmer head 10 set forth in FIG. 8, showing the spool 20 with the bearing assembly beneath it, the lower housing plate 24, the indexing knob 16 and bump knob 18, can be handled as a unit. It can be snapped to the main housing 22 by aligning the tabs 42, 42a with their respective openings 44, 44a in the main housing 22. The main housing 22 would be attached to the trimmer using the threaded shaft extension 12. The internal diameter of the spring 50 is sized so that it stays attached to the raised portion 30 located on the top interior surface 28 at the center of the main housing 22.

To load trimmer line into the trimmer head 10, the user must simply align the arrows 102 located on opposite sides of the indexing knob 18 with the eyelets 40, 40a of the main housing 22. By doing this, the opposed line channel openings 64, 64a will be aligned with the respective eyelets 40, 40a as shown in FIG. 1-4. The user can then insert one end of a strip of line (not shown) through one of the eyelets 40 and continue to push the trimmer line into the trimmer head, where it will enter the line channel opening 64 and pass through the passageway 66 of the spool 20. The line diverter 69 will cause the trimmer line to travel to the right side of the central bore 56 in the spool 20 and will continue on to the opposite line channel opening 64a provided on the middle flange 61 and will exit the opposite eyelet 40a.

While it is envisioned that any length of trimmer line can be used, the length of line is dictated to some extent by the size of the space between the middle and uppermost or lowermost flanges that will hold the wound trimmer line. Generally lengthens as long as about 16 feet should be easily handled by this trimmer head 10.

The trimmer line should be pulled through the trimmer head 10 until about half of its length extends approximately equally from both sides of the housing 14. Once this is done, the user may then turn the lower indexing knob 16 in the direction indicated on the knob, such as by arrows 104 (see FIG. 3).

The turning of the indexing knob 16 results in a corresponding rotation of the internal spool 20. This action results in the trimmer line being pulled into the internal volume of the trimmer head and wrapped onto the spool 20. Specifically, the line entering from one side of trimmer head 10 would be bent by the main housing 22 and pushed through the gap 65 in the line channel opening 64, so as to wrap around the central barrel 57 of the spool 20 between the uppermost flange 62 and the middle flange 61. The line entering from the second, other side of the trimmer head 10 would be bent by the main housing and pushed through the gap 65a in the line channel opening 64a, so as to wrap around the central barrel 57 of the spool 20 between the middle flange 61 and lowermost flange 60 of the spool 20. The user would continue turning the indexing knob 16 until all the trimmer line is inside the internal volume of the trimmer head 10 except for approximately six inches left extending from each eyelet 40, 40a. The user would then be ready to proceed with utilizing the trimmer and cutting grass or weeds.

In use, the operation of the string trimmer will spin the housing 14 of the trimmer head 10. When the head is not in the bumped position, the biasing spring 50 keeps the spool biased and compressed in the down position against the lower housing plate 24. The tabs, 68a through 68f, located on the uppermost flange 62 of the spool 20 will be pushed by the projections 41 and 43 such that the spool will spin at the same speed as the housing 14. If the head is spinning clockwise when observed from above, then the ramp-like, offset angled projections 43 will push the tabs 68. Conversely, if the trimmer head 10 is spinning counterclockwise when observed from above, then the projection 41 parallel to axis A will push the tabs 68 on the spool 20.

When the trimmer head is bumped on the ground, the bump knob 18 will impact the ground and will be forced upward relative to the housing 14. The bump knob 18 will slow or stop its rotation upon impacting the ground. The bump knob 18, indexing knob 16 and the spool 20 are all operatively connected, and consequently, are all forced upward relative to the housing 14. As the spool 20 moves upward relative to the housing 14, the biasing spring 50 is compressed and the tabs 68 are raised higher than the projections 41 and 43. In this raised position, the housing 14 and the trimmer line extending from the housing are still rotating at the speed of the trimmer. Even though the bump knob 18 has stopped rotating as a result of coming into contact with the ground, the bearing assembly 90 allows the spool 20 to continue to rotate at approximate the same speed as the housing 14. In this bumped position, the air drag on the trimmer line extending from the housing 14 is sufficient enough to pull and spin the internal spool allowing a length of line to be pulled or indexed from the trimmer head 10. The spool 20 will rotate relative to the housing 14 until the tabs 68 impact the tabs 106 located along the periphery of the interior top surface 28 of the main housing 22 (see FIG. 7). At this point, the trimmer head is lifted from the ground and the biasing spring 50 again pushes the spool 20, bearing assembly 90 and the bump knob 18 downward relative the housing 14. The air drag on the trimmer line will again rotate the spool 20 until the tabs 68 again come to rest against one of the projections 41 or 43.

It will be evident that one particular advantage of a trimmer head of the present invention is the use of ball bearings 98 to attach the bump knob 18, so that the bump knob can remain free spinning, independent of any of the other components of the trimmer head 10. As such, minimal wear occurs to the bump knob 18 as it contacts the ground. Worn bump knobs are a frequent compliant of many trimmer head owners. Because the bump knob 18 is free rotating and decoupled from the spool 20 and housing 14 with regards to its rotation, the direction that the trimmer line is wound on the spool 20 relative to the rotational direction of the housing 14 does not impact the release of trimmer line from the trimmer head 10. This arrangement is believed unique relative to previous heads in the marketplace, particularly for easy-load bump-activated trimmer heads. Additionally, because bump knob 18 is not attached to the trimmer head 10 using a threaded bolt, the head is further unique in that the bump knob 18 will not detach if a right handed bolt is used with a counterclockwise rotating head, or vice versa.

It will be appreciated that a trimmer line 10 can be wound onto an internal spool 20 without disassembly of the trimmer head. It will be further appreciated that the trimmer head 10 can be attached to clockwise-rotating trimmers using standard right-hand hex nuts and hex bolts or the same trimmer head can be attached to counterclockwise trimmers using standard left-hand hex nuts and hex bolts. Finally, it will be appreciated that the trimmer line can be release upon bumping regardless of the direction that the trimmer line is wound onto the spool and regardless of the rotational direction of the housing.

Figure 20:
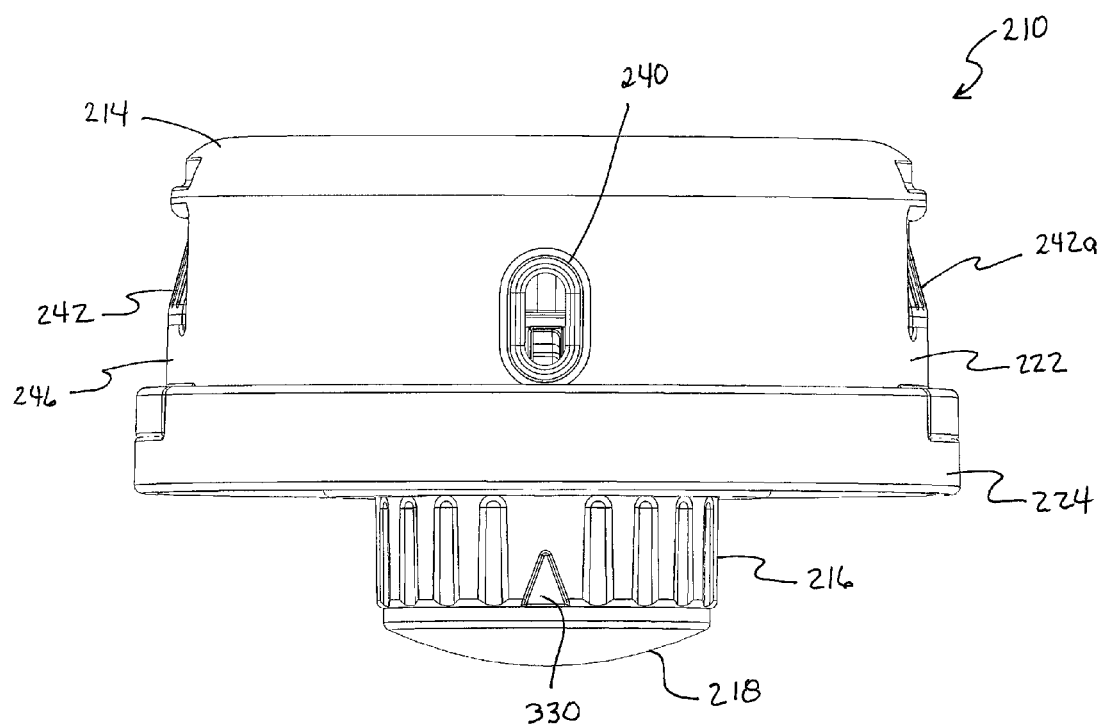
FIG. 20 is a side elevation view of second embodiment of a trimmer head according to the concepts of the present invention.
Figure 21:
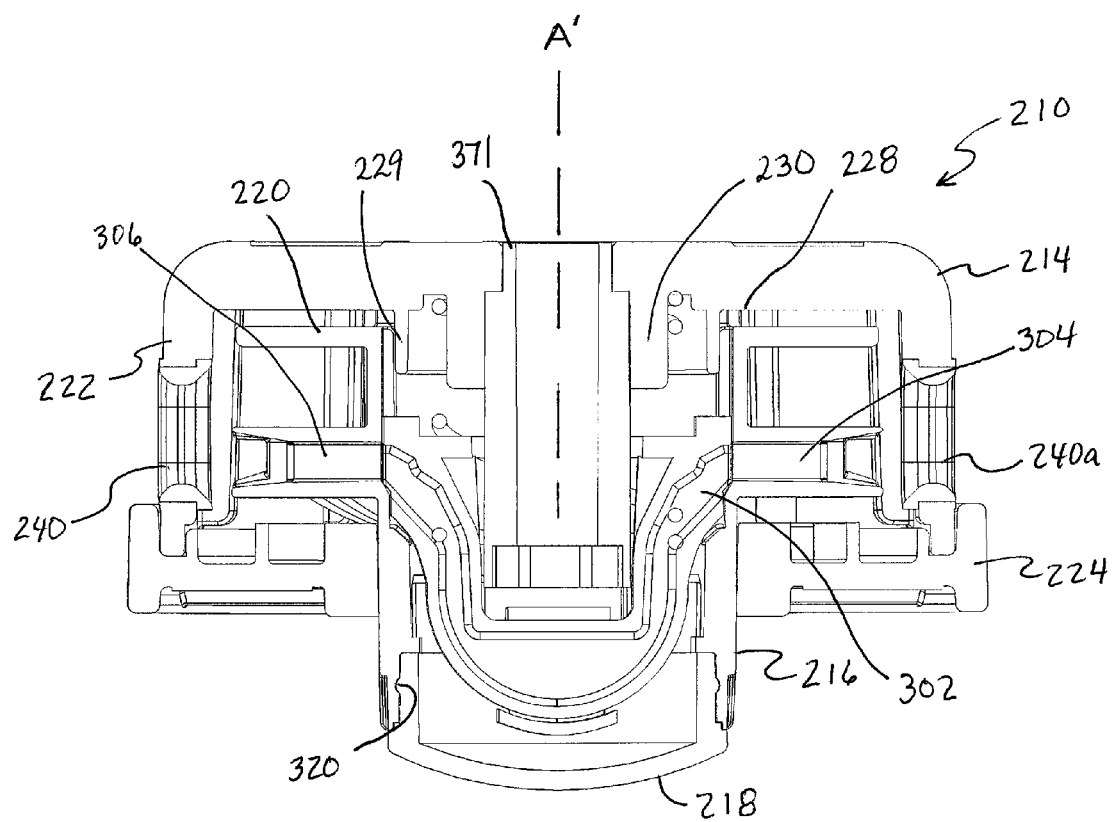
FIG. 21 is a sectional perspective view of the trimmer head of FIG. 20.

A second representative embodiment of a trimmer head according to the concepts of the present invention is designated generally by the numeral 210 in FIGS. 20 and 21 herein. Unlike the previous embodiment, however, this embodiment of the trimmer head 210 is designed to be attached to a string trimmer utilizing a standard assortment of fasteners as would be normally used to fasten a trimmer head to a trimmer shaft. Commonly, the fasteners all have 16 mm hex heads. Some could have left-handed treaded attachments, while others could have right-handed threaded attachments, with a variety of thread sizes offered. Thus, this embodiment would require the consumer to match the appropriate trimmer head fastener to the trimmer shaft for proper attachment of the trimmer head to the trimmer shaft. No shaft extension is required in this embodiment.

Like the previous embodiment of the trimmer head, this trimmer head 210 also generally includes a housing 214, an indexing knob 216 and a bump knob 218. A spool 220 is also generally included in the trimmer head 210 of the present invention. Bump knob 218 is unique in that it may rotate independently of the housing 214, indexing knob, 216, spool 220 or any of the other major components of the trimmer head 210. That is, the bump knob 218 is free to rotate about the same axis A' of rotation as the trimmer shaft, and does so independently of the trimmer shaft, housing 214, indexing knob 216, or spool 220.

Figure 32:
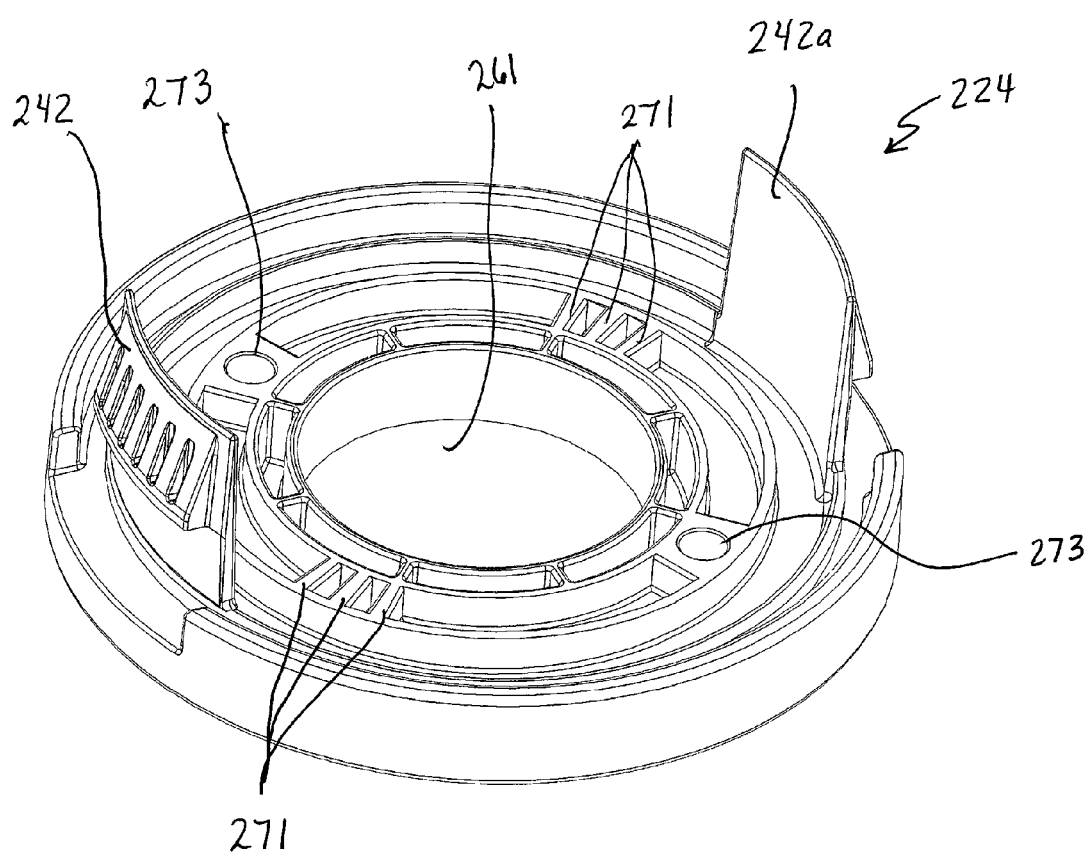
FIG. 32 is a perspective view of the lower housing plate of the trimmer head of FIG. 20.

Housing 214 includes a main housing 222 and a lower housing plate 224. Like the previous embodiment, the main housing 222 and lower housing plate 224 define the internal volume of the housing 214 and encase at least the spool 220 therein. Main housing 222 and lower housing plate 224 are connected by tabs 242, 242a located on opposite sides of the lower housing plate 224 relative to the circumference of the housing 214, as can be seen in at least FIGS. 23 and 32. More specifically, these tabs 242, 242a extend upwardly into the interior of the main housing 222, to be received by openings 244, 244a in the sidewall 246 of the main housing 222. Thus, tabs 242, 242a are used to hold the lower housing plate 224 to the main housing 222. Thus, should a user desire to separate the main housing 222 from the lower housing plate 224 in order to view or otherwise repair or replace one or more of the components within the housing 214, the user simply needs to press the tabs 242, 242a essentially simultaneously toward the center of the trimmer head 210 and pull the main housing 222 from the lower housing plate 224.

Like the previous embodiment, the housing 214, and specifically, the main housing 222, also includes a pair of opposed eyelets, 240, 240a through which a trimmer line (not shown) may be discharged during cutting of vegetation. The eyelets 240, 240a are shown to be oval or oblong in shape, but may take any shape useful in the art, including, for example, round in shape. The eyelets 240, 240a are shown as located on the main housing 222.

Figure 22:
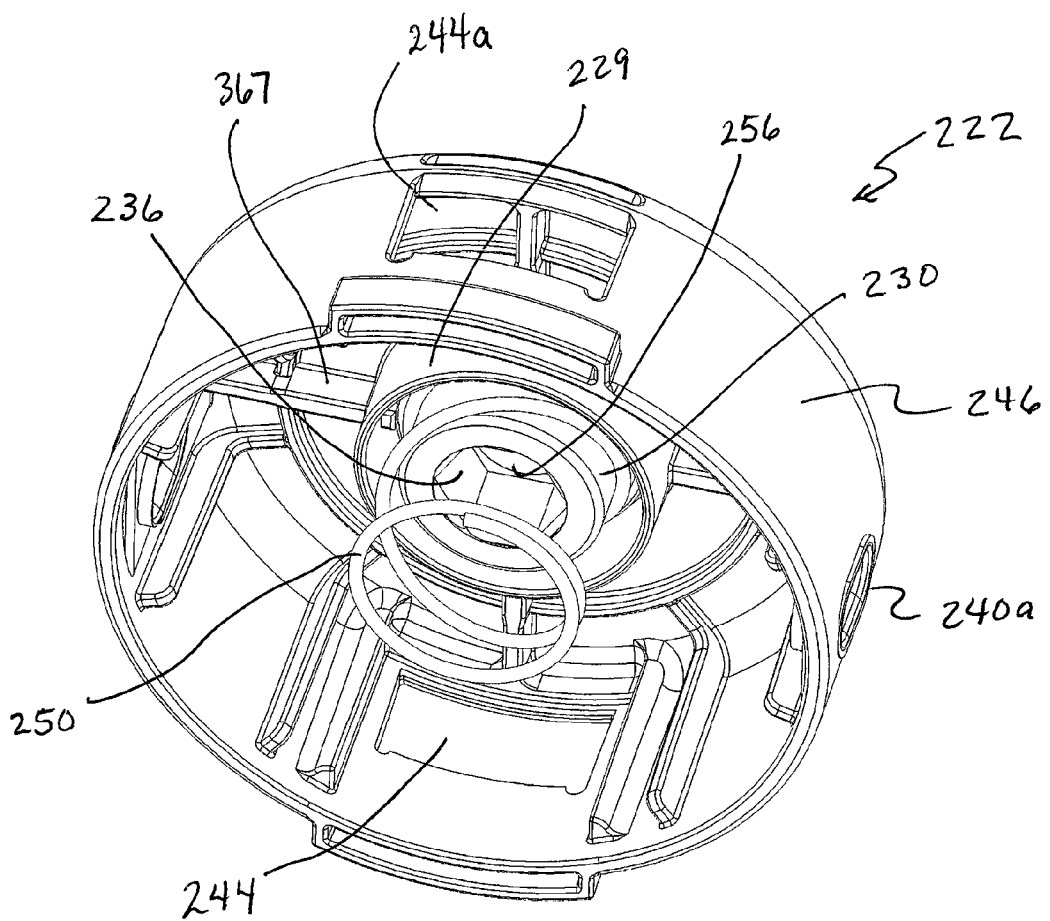
FIG. 22 is a perspective view showing the interior of the main housing of the trimmer head of FIG. 20.

The main housing 222 of the trimmer head 210 is depicted in FIG. 22 with just a biasing spring 250 installed. As noted above, the consumer would attach this housing to the stem of their trimmer by placing the appropriate nut or bolt into the hexagon cavity 236. There is a central bore 256 through the top of the main housing 222 in the middle of the hexagonal cavity 236 through which the stem of the trimmer or of a bolt (not shown) would pass. The hexagonal cavity 236 is created by a raised portion 230 extending into the housing from the interior top surface 228 of the main housing 222. In addition, a wall 229 also extends radially around the hexagonal cavity 236 from the interior top surface 228 of the main housing 222. A biasing spring 250 may then be provided that is of a suitable size and diameter as to rest snugly within the space created between the radial wall 229 and the raised portion 230. In this embodiment, the biasing spring 250 will rest on the line channel assembly 300 within the center barrel of the spool 220 to compress the spool 220 against the lower housing plate 224.

Figure 23:
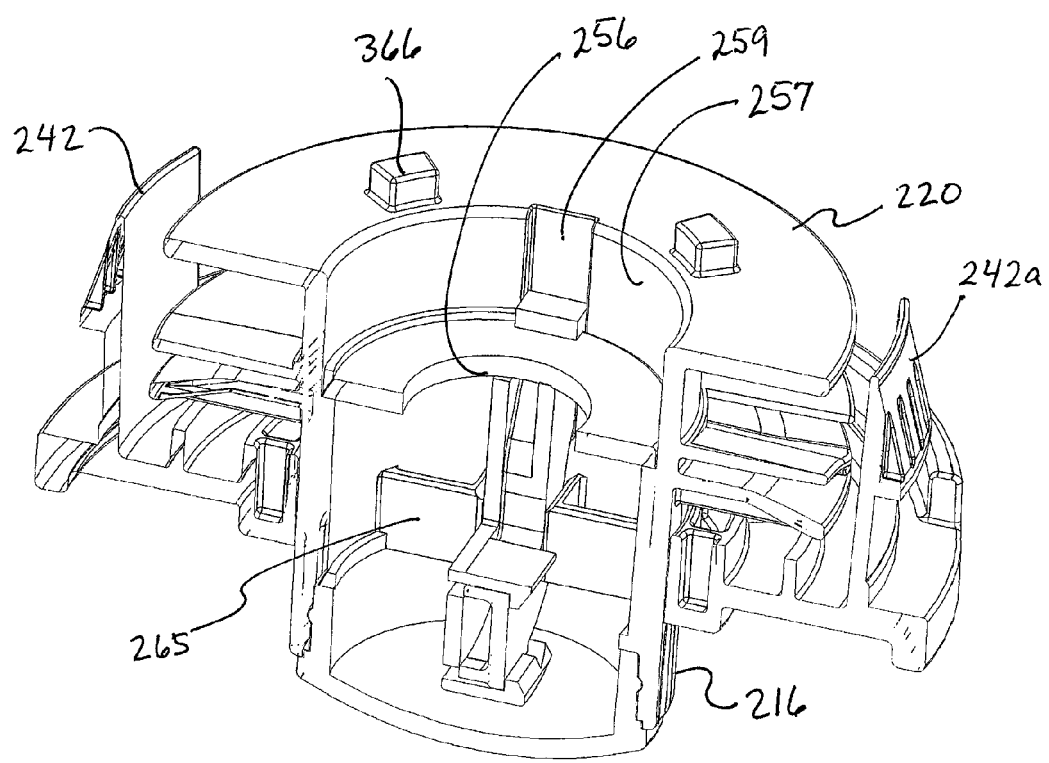
FIG. 23 is a sectional perspective view of the spool, indexing knob, and lower housing plate of the trimmer head of FIG. 20.
Figure 24:
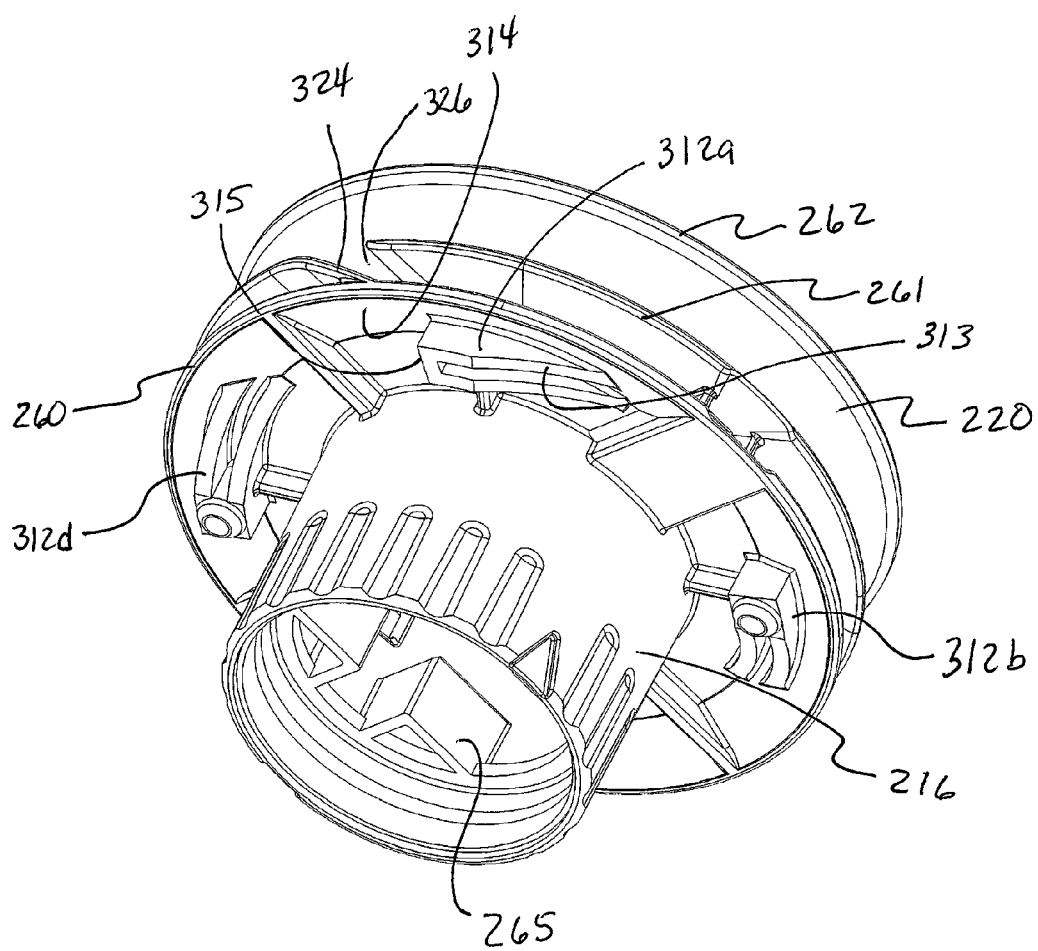
FIG. 24 is a perspective view of the integral indexing knob and spool of a second embodiment taken from above.
Figure 25:
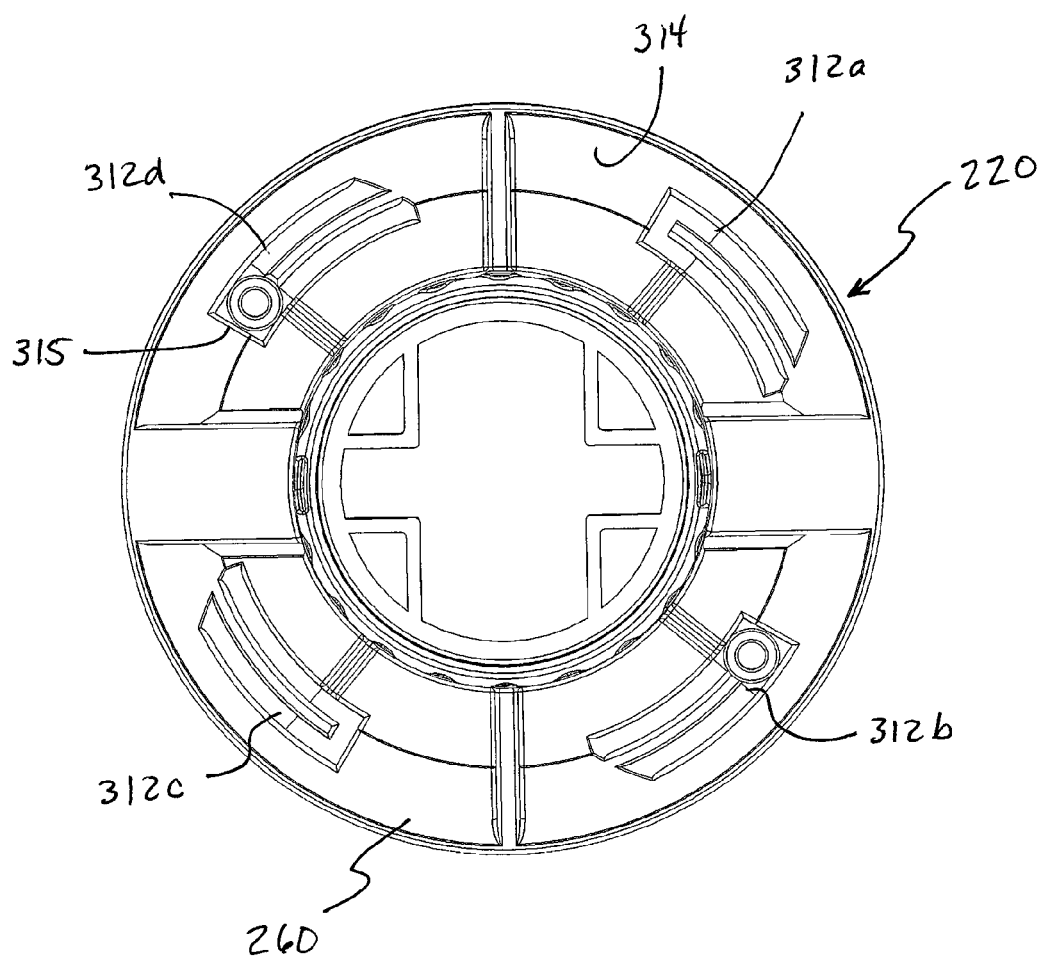
FIG. 25 is a bottom plan view of the spool of the second embodiment trimmer head in accordance with the concepts of the present invention.
Figure 26:
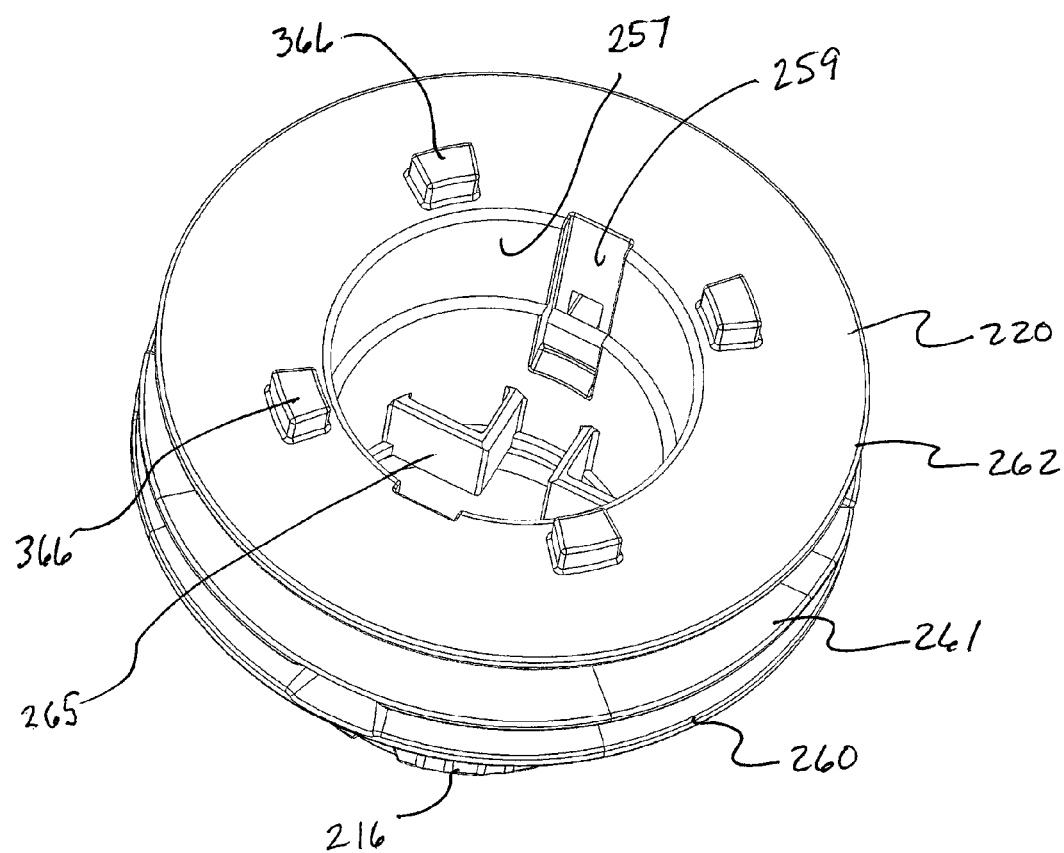
FIG. 26 is a perspective view of the spool of FIG. 25 taken from above.
Figure 27:
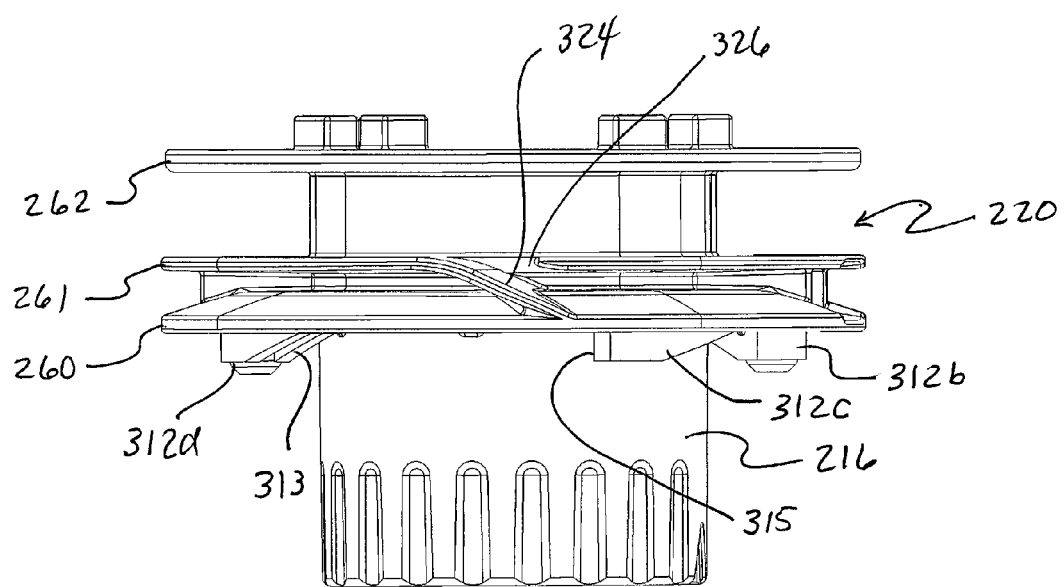
FIG. 27 is a side elevation view of the integral indexing knob and spool of FIG. 24.

As shown in FIGS. 23, 24 and 27, the spool 220 is provided as being integrally molded with indexing knob 216 as one piece. In an alternative embodiment, the spool 220 and the indexing knob 216 may be two or more parts, with the spool 220 fastened to the indexing knob 216 by any means known in the art. Preferably, the two components should be fastened such that the spool 220 moves up and down and rotationally together with the indexing knob 216.

The spool 220 includes a central barrel 257 that is larger than the central bore 256. A line channel assembly 300 is designed to be inserted into the central barrel 257 of the spool 220. There are two opposed grooves 259 along opposite sides of the central barrel 257 of the spool along with four sets of angled ribs 265 which hold the line channel assembly 300 in its desired position so that the internal line channel passageway 302 of the line channel assembly 300 aligns with the two line channels passages 304, 306, on the opposite sides of the middle flange 261 of the spool 220. An advantage of this design approach for the line channel assembly 300 is that it can be removed and replaced if damaged. Another advantage is that two line channel assemblies could be provided with the head. For example, a second assembly could be supplied that has a line channel straight across rather than dipping downward and back up. This would be an advantage in that trimmer line would be easier to insert, especially with larger line sizes. This alternate option could be used for straight shaft trimmers, which often use larger sizes of trimmer line. The design of the line channel assembly shown in FIG. 21 has been optimized for trimmers that have a long mounting stem. The entire unit shown in FIG. 23 is designed to be snap fitted into the housing 214. Accordingly, when the main housing 222 and the lower housing plate 224 are snapped together by tabs 242, 242a, the unit shown in FIG. 23 will be held within the housing 214, except for the indexing knob 216 and bump knob 218, which extend through the central aperture 261 of the lower housing plate 224 (see FIG. 32).

Figure 31:
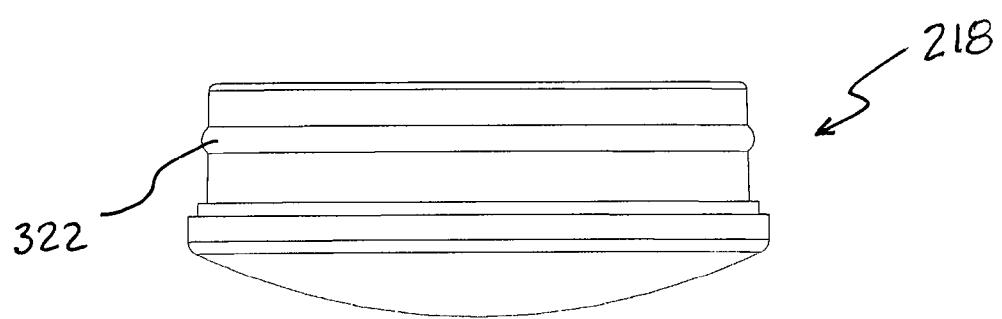
FIG. 31 is a side elevation view of the bump knob of the trimmer head of FIG. 20.

With respect to the bump knob 218, it is disposed within the indexing knob 216. There is a circular groove 320 positioned along the inside perimeter of the circular indexing knob 216. The bump knob 218, as shown in FIG. 31, has a corresponding circular protrusion 322 long its outside perimeter. The bump knob 218 and indexing knob 216 are sized such that when the bump knob 218 is pressed into the inside of the indexing knob 216, the two pieces snap together with protrusion 322 mating with groove 320. The bump knob 218 is then able to rotate freely.

When the trimmer head 210 is bumped on the ground, the bump knob 218 comes in contact with the ground. Its rotational speed will decrease and possibly stop depending on the length of time that the bump knob 218 is pressed against the ground. However, the change in rotational speed of the bump knob 218 has a negligible affect on the rotational speed of the spool 220. As a result, the air drag on the trimmer line (not shown) can pull additional line from the spool 220 whether the unit is rotating clockwise or counterclockwise in the same manner essentially described above for the previous embodiment.

The spool 220 is shown in various perspectives in FIGS. 23 to 27. The spool 220 generally includes at least three flanges 260, 261, 262 essentially parallel to each other. Between the middle flange 261 and one of either the uppermost or lowermost flanges (for this description the lowermost will be used) is a passageway comprising the line channel 304 and line channel 306. The line channels 304, 306 are on opposite sides of the spool 220 and are in operative communication with the line channel passageway 302 of the line channel assembly 300 such that a trimmer line inserted into one of the line channels 304 or 306 will travel through that line channel, through the line channel passageway 302 of the line channel assembly 300 and out the other line channel. In this embodiment, the middle flange 261 and a lower flange 260 form the top and bottom walls of the line channels 304, 306. There are also two upstanding side walls to form the line channels 304, 306.

When the trimmer head 210 is fully assembled, the user aligns the arrow(s) 330 on the indexing knob 216 with the eyelet(s) 240, 240a as shown in FIG. 20. The consumer can then cut a length of trimmer line (not shown) up to about fifteen feet in length. One of the free ends of the trimmer line would be pushed through one of the eyelet 240a and into the line channel 304. The line then travels down through the line channel passageway 302 of the line channel assembly 300 and back up again till it enters the line channel 306 located on the opposite side of the spool 220. Finally, the line passes through the opposing eyelet 240 located on the opposite side of the trimmer head 210.

Once the trimmer line is pushed through the line channel and the passageway, the consumer can continue to pull the trimmer line through the trimmer head 210 until approximately half of the trimmer line is set forth on each side of the trimmer head 210. It is at this point that the consumer can turn the indexing knob 216 to wind the trimmer line onto the spool 220.

At this point, it is noted that, for the present embodiment, the spool 220 contains a set of, here, four projections 312a to 312d, located on the bottom surface 314 of the lowermost flange 260. Each of these projections 312a to 312d are in the form of a ramp, having an offset angle relative to the shaft. The four indexing ramp-like projections 312a to 312d located on the bottom surface of the lower flange 260 of the spool 220 are biased by the spring 250 to interface with the ramp interface ribs 271 and the ramp interface plates with hole 273 located on the interior surface of the lower housing plate 224. The orientation of the slanted (i.e., offset angled) ramps 313 on the projections 312a to 312d along with the vertical wall 315 of the projections 312a to 312d allow for counterclockwise rotation of spool 220 when looking from above. The same rotation is clockwise from the position of the consumer when winding line onto the head. This direction of rotation will cause the line to wrap clockwise around the spool when looked at from above. The spool will rise and fall as the ramps ride over the ramp interface ribs 271 and plates with hole 273. From the consumer's perspective, the line will always be wound in the same direction, and the ramp-like projections will control the direction of winding. For a left handed person, they may prefer to wind the line counterclockwise when looking at the bottom of the head. This would be possible if the ramps were reversed.

It would be possible to design the same head but without ramps. Two sets of projections would still be needed to lock the spool rotation to the housing rotation when the spool is in the lower position (non-bumped position). And, bumping the unit on the ground would need to allow the spool to rotate freely of the housing rotation. The consumer would simply rely upon arrows or other markings to align the line channel with the eyelets; and, the consumer would have to push the bump knob to compress the spring before turning the spool to wind the line.

The upstanding walls to the line channels 304 and 306 are recessed slightly from the perimeter of the middle and lowermost flanges 260 and 261. As the spool 220 is rotated, the trimmer line is wrapped into the space between the middle and lowermost flanges 260 and 261 and to the left of the line channel 304 or 306. The line then rises up on an inclining portion 324 connecting the lower and middle flanges 260, 261, and passes through a gap opening 326 in the middle flange. The trimmer line winds in the space defined by the spool barrel and the upper flange 262 and the middle flange 261. The advantage of this design is that the entry of the trimmer line is controlled to the space closest to the barrel. There is not a piece of line bending from the line channel exit on the flange perimeter to the barrel, and thus internal welding of the line is eliminated. This design also has the advantage that all four sides of the exit to the line channel extend close to the perimeter of the flange. This makes feeding the line through the eyelet 240, 240a and into the line channel 304 or 306 easier.

An alternate spool design could have four flanges. The opposing line channels 304 and 306 would be placed between the two middle flanges (261 and second middle flange not shown). The space to the left of one line channel 304 could be designed with an inclining portion 324 connecting from the upper middle flange to the lower middle flange, with an gap opening 326 allowing the trimmer line to pass into the space defined by the spool barrel, the lowest flange, and the lower middle flange. The space to the left of the second line channel 306 could be designed with a inclining portion connecting from the lower middle flange to the upper middle flange, with the adjacent opening on the upper middle flange. This would allow the opposing end of the trimmer line to fill the space between the barrel, the upper most flange, and the upper middle flange: This design would be an improvement over the prior art because the exit to the line channel would have four sides all extending close to the perimeter of the flange, and yet the initial wrap on the spool barrel would still occur at the barrel.

Figure 28:
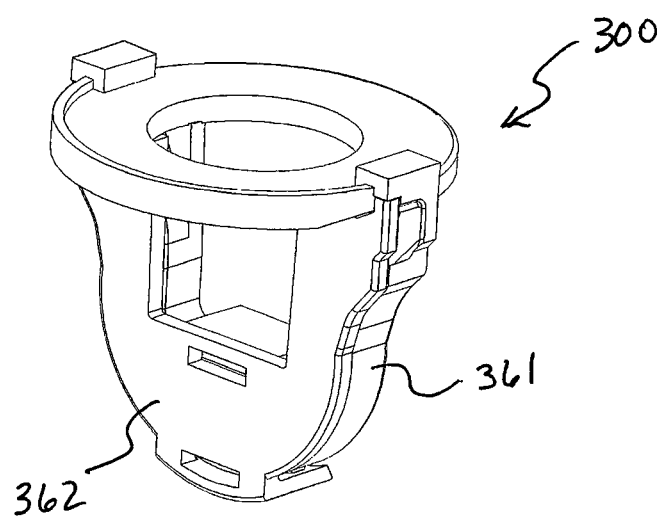
FIG. 28 is a perspective view of a line channel assembly of the second embodiment of the trimmer head in accordance with the present invention.
Figure 29:
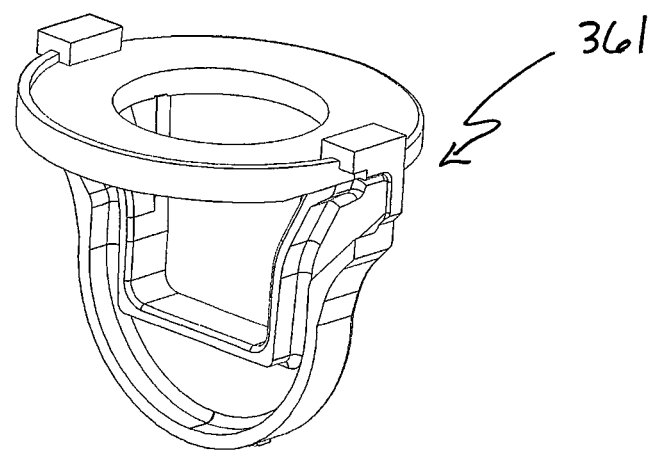
FIG. 29 is a perspective view of the main body of the line channel assembly of FIG. 28.
Figure 30:
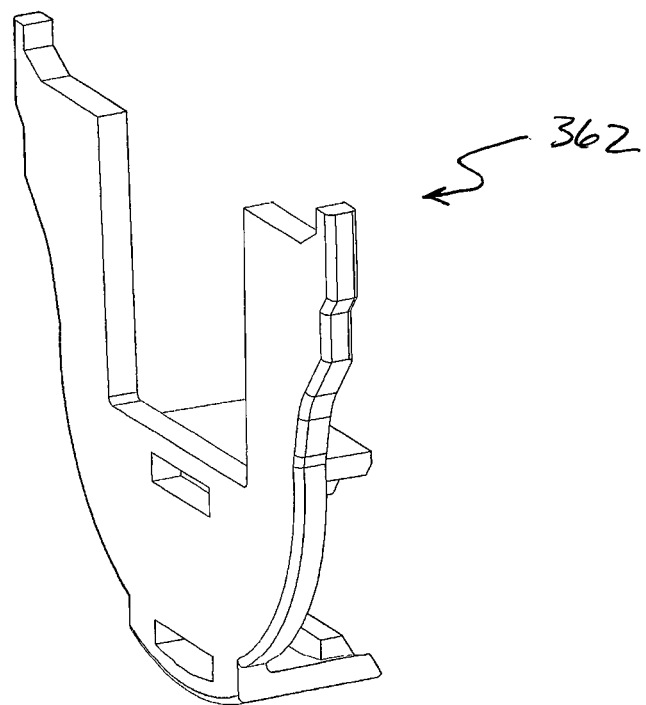
FIG. 30 is a perspective view of the cover of the line channel assembly of FIG. 28.

The line channel assembly 300 is shown generally in FIG. 28. It is shown designed using two pieces 361 and 362. The main body of the line channel assembly 361 is shown in FIG. 29. Three of the four walls of the line channel assembly 300 are formed by this part. The cover 362 for the line channel assembly is shown in FIG. 30, which supplies the fourth wall for the line passageway. Once assembled, line passageway 302 is formed between these two pieces. And, the line channel assembly 300 can be positioned into the spool 220.

When the trimmer head 210 loaded with line is rotated by a trimmer, there is sufficient resistance between the ramp interface ribs 271 and plates with holes 273 against either the four vertical walls 315 or the four slanted ramps 313 such that the line is not released regardless of the direction of rotation. However, if the trimmer head is bumped on the ground, then the spool 220 is lifted such that the spring 250 is compressed; and, both the four slanted ramps 313 and the four vertical walls 315 can clear the top of the ramp interface ribs 271 and the ramp interface plate with holes 273 regardless of the direction of rotation.

When the spool is in the bumped or up position, then the spool 220 will turn in a direction determined by the air drag pulling on the line. Line will be removed from the spool 220 until the four tabs 366 located on the top of the spool 220 impact the four ribs 367 located on the interior top surface 228 of the main housing 222. After the impact of the tabs 366 with the ribs 367, then the spring 250 will push the spool 220 back into the down position. Again a length of line will be pulled out of the head 210 until the four vertical walls 315 or the four slanted ramps 313 come into contact with the two sets of ramp interface ribs 271 and the two ramp interface plates with holes 273.

Because the resistance between the bump knob 218 and the spool 220 is negligible, air drag can easily pull trimmer line from the head 210 regardless of the direction of rotation of the trimmer machine. The head design is unique because all the parts only fit together one way; there is no assembly based upon the direction of rotation of the trimmer.

As shown in FIG. 21, it will be appreciated that an optional spacer 371 which can be used if the trimmer has a long stem. The use of these spacers is common. However, the head is unique in that the line channel allows room for use of this spacer. Additionally, the line channel is unique in that the line passes down towards the bump knob and then back up.

It should thus be evident that trimmer heads made according to the concepts of the present invention will have a free-rotating bump knob (ground contact member), 2) have an internal line channel or passageway to guide the trimmer line from one eyelet to the opposite eyelet making it possible to load the line into the head without disassembly of the head, 3) utilize air drag as essentially the sole means to incrementally extend the stored trimmer line from the head when the unit is bump-activated, and 4) is universally adaptable, meaning they can function clockwise and counterclockwise utilizing just one set of ramps or projections, which control the direction of winding line on the internal spool. Heretofore, it is believed no such trimmer heads have been contemplated or exist.

It is thus evident that a trimmer head constructed as described herein substantially improves the art. Only particular embodiment(s) have been presented and described in detail, and the invention should not be limited by the drawings or the description provided. For an appreciation of the true scope and breadth of the invention, reference should be made only to the following claims.

What is claimed is:

1. A bump-activated trimmer head for a rotary trimmer of the type that utilizes wound trimmer line to cut vegetation and has a shaft defining a rotation axis, the trimmer head comprising:
   a housing configured to be attached to the rotary shaft of the rotary trimmer, the housing and having at least a pair of opposed eyelets through which the trimmer line is dischargeable for cutting the vegetation;
   a spool encased within the housing and having a passageway for the trimmer line, the passageway having opposed ends and extending from one side of the spool to an opposite side, the opposed ends of the passageway being alignable with the opposed eyelets of the housing;
   a bump knob external to the housing and configured to rotate about the same rotation axis as the shaft, wherein the bump knob is operationally connected to the spool to provide bump-activated advancing of the trimmer line from the spool;
   an indexing knob external to the housing and operatively connected to the spool for turning the spool for the purpose of winding the trimmer line onto the spool, such that the trimmer line is windable onto the spool without rotation of the bump knob; and
   a bearing assembly operationally connecting the bump knob to the spool such that the bump knob is configured to rotate independently of the indexing knob, the shaft, the housing, and the spool.

2. The bump-activated trimmer head as claimed in claim 1, wherein the housing includes a main housing and a lower housing plate, and wherein said main housing includes a biasing means for compressing the spool against the lower housing plate.

3. The bump-activated trimmer head as claimed in claim 2, further comprising two sets of projections, wherein one set of projections is located on an interior surface of the housing and the other set of projections is located on the spool, wherein at least one of the sets of projections has a ramp portion that is at an offset angle relative to the shaft, such that the indexing knob can turn the spool in a direction toward the ramp portion having the offset angle to overcome the biasing means.

4. The bump-activated trimmer head as claimed in claim 3, wherein the ramp portion having the offset angle is located on the interior surface of the housing.

5. The bump-activated trimmer head as claimed in claim 3, wherein the ramp portion having the offset angle is located on the spool.

6. The bump-activated trimmer head as claimed in claim 1, wherein at least a portion of the passageway of the spool is removable from the spool.

7. The bump-activated trimmer head as claimed in claim 1, wherein the passageway passes through the rotation axis of the shaft.

8. The bump-activated trimmer head as claimed in claim 1, wherein the passageway circumvents the rotation axis of the shaft.

9. The bump-activated trimmer head as claimed in claim 1, wherein the spool further comprises at least three flanges essentially parallel to each other, and wherein the opposed ends of the passageway are located between the same two flanges, and wherein the same two flanges are operationally connected by at least one inclining portion on one of the two flanges and at least one opening on the other of the two flanges, thereby allowing passage of the trimmer line up the at least one inclining portion, through the at least one opening, and into a space defined by the flange having the at least one opening and the third flange.

10. The bump-activated trimmer head as claimed in claim 9, wherein the opposed ends of the passageway are located between a first flange and a middle flange, wherein the first flange includes two inclining portions positioned about 180 degrees opposite each other relative to the circumference of the first flange, and wherein the middle flange includes two openings in alignment and essentially contiguous with the two inclining portions of the first flange, such that, when the indexing knob is turned and the spool rotated, the trimmer line extending from each of the opposed eyelets of the housing is wound between the first and middle flange, up the inclining portions of the first flange, through the openings of the middle flange, and into a space between the middle flange and the third flange.

11. The bump-activated trimmer head as claimed in claim 9, wherein the spool has four flanges in parallel, wherein the opposed ends of the passageway are located between the two middle flanges and wherein a first middle flange includes an inclining portion and an opening located about 180 degrees opposite each other relative to the circumference of the first middle flange, wherein the second middle flange includes an opening in alignment and essentially contiguous with the inclining portion of the first middle flange and an inclining portion in alignment and essentially contiguous with the opening of the first middle flange, such that, when the indexing knob is turned and the spool rotated, the trimmer line extending from one of the opposed eyelets of the housing is wound between the first and second middle flanges, up the inclining portion of the first middle flange, through the opening of the second middle flange, and into a space between the second middle flange and a first outer flange, while the trimmer line extending from the other of the opposed eyelets of the housing is wound between the first and second middle flanges, up the inclining portion of the second middle flange, through the opening of the first middle flange, and into a space between the first middle flange and a second outer flange.

12. The bump-activated trimmer head as claimed in claim 1, wherein the indexing knob is integrally connected to the spool as one piece.

13. The bump-activated trimmer head as claimed in claim 1, wherein the indexing knob is connected to the spool by screws.

14. The bump-activated trimmer head as claimed in claim 2, wherein the bearing assembly is positioned between the spool and the lower housing plate.

15. The bump-activated trimmer head as claimed in claim 14, wherein the bearing assembly includes a plurality of ball bearings resting in depressions molded into a bearing plate.

16. The bump-activated trimmer head as claimed in claim 1, wherein the bump knob has a snap-fit connection to another part of the trimmer head and does not include the use of a bearing assembly to allow the bump knob to rotate independently of the spool.

17. The bump-activated trimmer head as claimed in claim 16, wherein the part of the trimmer head to which the bump knob is attached is the indexing knob.

18. The bump-activated trimmer head as claimed in claim 1, wherein the bump knob, the indexing knob, or both, is configured to rotate clockwise and counter-clockwise about the rotation axis.

* * * * *